US009699122B2

(12) United States Patent
Appelman

(10) Patent No.: US 9,699,122 B2
(45) Date of Patent: *Jul. 4, 2017

(54) USER INTERFACES FOR PROVIDING SUPPLEMENTAL CONTACT INFORMATION CORRESPONDING TO A REFERENCED INDIVIDUAL

(71) Applicant: Facebook, Inc., Menlo Park, CA (US)

(72) Inventor: Barry Appelman, McLean, VA (US)

(73) Assignee: FACEBOOK, INC., Menlo Park, CA (US)

( * ) Notice: Subject to any disclaimer, the term of this patent is extended or adjusted under 35 U.S.C. 154(b) by 520 days.

This patent is subject to a terminal disclaimer.

(21) Appl. No.: 13/784,647

(22) Filed: Mar. 4, 2013

(65) Prior Publication Data

US 2013/0275526 A1   Oct. 17, 2013

Related U.S. Application Data

(63) Continuation of application No. 13/149,368, filed on May 31, 2011, now abandoned, which is a (Continued)

(51) Int. Cl.
*G06F 3/00* (2006.01)
*H04L 12/58* (2006.01)
(Continued)

(52) U.S. Cl.
CPC .......... *H04L 51/046* (2013.01); *G06F 3/0482* (2013.01); *G06F 15/16* (2013.01);
(Continued)

(58) Field of Classification Search
CPC combination set(s) only.
See application file for complete search history.

(56) References Cited

U.S. PATENT DOCUMENTS 4,837,798 A   6/1989   Cohen et al.
5,086,394 A   2/1992   Shapira
(Continued)

FOREIGN PATENT DOCUMENTS

EP   0862304   9/1998
EP   1176840   1/2002
(Continued)

OTHER PUBLICATIONS

Dictionary.com, http://dictionary.reference/browser/dialogue, Dec. 8, 2007, 1 page.
(Continued)

*Primary Examiner* — Hien Duong
(74) *Attorney, Agent, or Firm* — Keller Jolley Preece

(57) ABSTRACT

Providing supplemental contact information for an individual referenced in an electronic message typically includes receiving an electronic message, examining the electronic message, detecting an identifier for a referenced individual contained in the electronic message, and making supplemental contact information for the referenced individual available to a recipient of the electronic message. The supplemental contact information may include information that is in addition to information contained in the electronic message. The supplemental contact information may include at least one of an e-mail address, a screen name, a telephone number, a facsimile number, and a mailing address each of which is associated with the referenced individual.

29 Claims, 12 Drawing Sheets

Related U.S. Application Data continuation of application No. 10/146,814, filed on May 17, 2002, now Pat. No. 7,979,802, which is a continuation-in-part of application No. 09/843,788, filed on Apr. 30, 2001, now abandoned.

(60) Provisional application No. 60/229,311, filed on Sep. 1, 2000, provisional application No. 60/201,738, filed on May 4, 2000.

(51) Int. Cl.
    *G06Q 10/10*     (2012.01)
    *G06F 15/16*     (2006.01)
    *G06F 3/0482*     (2013.01)
    *G06F 3/0481*     (2013.01)
    *G06F 3/0484*     (2013.01)

(52) U.S. Cl.
    CPC ........... *G06Q 10/107* (2013.01); *H04L 12/58* (2013.01); *H04L 51/08* (2013.01); *G06F 3/04817* (2013.01); *G06F 3/04842* (2013.01); *H04L 12/581* (2013.01); *H04L 51/04* (2013.01)

(56) References Cited

U.S. PATENT DOCUMENTS

| Patent No. | Date | Inventor(s) | Ref |
|---|---|---|---|
| 5,276,905 A | 1/1994 | Hurst et al. | |
| 5,327,486 A | 7/1994 | Wolff et al. | |
| 5,533,110 A | 7/1996 | Pinard et al. | |
| 5,548,637 A | 8/1996 | Heller et al. | |
| 5,557,659 A | 9/1996 | Hyde-Thomson | |
| 5,583,920 A | 12/1996 | Wheeler, Jr. | |
| 5,608,786 A | 3/1997 | Gordon | |
| 5,610,910 A | 3/1997 | Focsaneanu et al. | |
| 5,650,994 A | 7/1997 | Daley | |
| 5,694,616 A | 12/1997 | Johnson et al. | |
| 5,721,906 A | 2/1998 | Siefert | |
| 5,742,905 A | 4/1998 | Pepe et al. | |
| 5,764,916 A | 6/1998 | Busey et al. | |
| 5,765,033 A | 6/1998 | Miloslavsky | |
| 5,774,670 A | 6/1998 | Montulli | |
| 5,790,800 A | 8/1998 | Gauvin et al. | |
| 5,793,365 A | 8/1998 | Tang et al. | |
| 5,802,470 A | 9/1998 | Gaulke et al. | |
| 5,835,724 A | 11/1998 | Smith | |
| 5,838,458 A | 11/1998 | Tsai | |
| 5,848,134 A | 12/1998 | Sekiguchi et al. | |
| 5,850,594 A | 12/1998 | Cannon et al. | |
| 5,859,979 A | 1/1999 | Tung et al. | |
| 5,867,162 A | 2/1999 | O'Leary et al. | |
| 5,870,549 A | 2/1999 | Bobo, II | |
| 5,870,744 A | 2/1999 | Sprague | |
| 5,872,521 A | 2/1999 | Loptaukin et al. | |
| 5,878,219 A | 3/1999 | Vance, Jr. et al. | |
| 5,893,091 A | 4/1999 | Hunt et al. | |
| 5,893,099 A | 4/1999 | Schreiber et al. | |
| 5,919,247 A | 7/1999 | Van Hoff et al. | |
| 5,920,692 A | 7/1999 | Nguyen et al. | |
| 5,940,488 A | 8/1999 | DeGrazia et al. | |
| 5,946,617 A | 8/1999 | Portaro et al. | |
| 5,948,058 A | 9/1999 | Kudoh et al. | |
| 5,951,643 A | 9/1999 | Shelton et al. | |
| 5,951,646 A | 9/1999 | Brandon | |
| 5,951,652 A | 9/1999 | Ingrassia, Jr. et al. | |
| 5,954,798 A | 9/1999 | Shelton et al. | |
| 5,956,716 A | 9/1999 | Kenner et al. | |
| 5,960,173 A | 9/1999 | Tang et al. | |
| 5,974,446 A | 10/1999 | Sonnenreich et al. | |
| 5,983,369 A | 11/1999 | Bakoglu et al. | |
| 5,987,407 A | 11/1999 | Wu et al. | |
| 5,991,791 A | 11/1999 | Siefert | |
| 5,995,023 A | 11/1999 | Kreft | |
| 6,002,402 A | 12/1999 | Schacher | |
| 6,006,179 A | 12/1999 | Wu et al. | |
| 6,009,413 A | 12/1999 | Webber et al. | |
| 6,009,462 A | 12/1999 | Birrell et al. | |
| 6,012,051 A | 1/2000 | Sammon, Jr. et al. | |
| 6,014,135 A | 1/2000 | Fernandes | |
| 6,014,638 A | 1/2000 | Burge et al. | |
| 6,018,571 A | 1/2000 | Langlois et al. | |
| 6,026,403 A | 2/2000 | Siefert | |
| 6,026,429 A | 2/2000 | Jones et al. | |
| 6,049,533 A | 4/2000 | Norman et al. | |
| 6,065,047 A | 5/2000 | Carpenter et al. | |
| 6,067,548 A | 5/2000 | Cheng | |
| 6,070,171 A | 5/2000 | Snyder et al. | |
| 6,073,138 A | 6/2000 | De l'Etraz et al. | |
| 6,081,830 A | 6/2000 | Schindler | |
| 6,085,223 A | 7/2000 | Carino, Jr. et al. | |
| 6,088,435 A | 7/2000 | Barber et al. | |
| 6,122,647 A * | 9/2000 | Horowitz et al. | 715/205 |
| 6,134,432 A | 10/2000 | Holmes et al. | |
| 6,144,991 A | 11/2000 | England | |
| 6,151,584 A | 11/2000 | Papierniak et al. | |
| 6,161,130 A | 12/2000 | Horvitz et al. | |
| 6,166,730 A | 12/2000 | Goode et al. | |
| 6,175,831 B1 | 1/2001 | Weinreich et al. | |
| 6,175,859 B1 | 1/2001 | Mohler | |
| 6,189,019 B1 * | 2/2001 | Blumer et al. | 715/205 |
| 6,192,395 B1 | 2/2001 | Lerner et al. | |
| 6,195,354 B1 | 2/2001 | Skalecki et al. | |
| 6,199,103 B1 | 3/2001 | Sakaguchi et al. | |
| 6,208,659 B1 | 3/2001 | Govindarajan et al. | |
| 6,212,548 B1 | 4/2001 | DeSimone et al. | |
| 6,212,550 B1 | 4/2001 | Segur | |
| 6,223,213 B1 | 4/2001 | Cleron et al. | |
| 6,233,318 B1 | 5/2001 | Picard et al. | |
| 6,233,577 B1 | 5/2001 | Ramasubramani et al. | |
| 6,240,430 B1 | 5/2001 | Deike et al. | |
| 6,249,740 B1 | 6/2001 | Ito et al. | |
| 6,249,743 B1 | 6/2001 | Ohshimo | |
| 6,260,148 B1 | 7/2001 | Aggarwal et al. | |
| 6,269,369 B1 | 7/2001 | Robertson | |
| 6,301,609 B1 | 10/2001 | Aravamudan et al. | |
| 6,311,211 B1 | 10/2001 | Shaw | |
| 6,313,855 B1 * | 11/2001 | Shuping et al. | 715/854 |
| 6,314,450 B1 | 11/2001 | Hachiya et al. | |
| 6,317,776 B1 | 11/2001 | Broussard et al. | |
| 6,324,541 B1 | 11/2001 | De l'Etraz et al. | |
| 6,330,590 B1 | 12/2001 | Cotten | |
| 6,347,332 B1 | 2/2002 | Malet et al. | |
| 6,349,327 B1 | 2/2002 | Tang et al. | |
| 6,351,698 B1 | 2/2002 | Kubota et al. | |
| 6,353,825 B1 * | 3/2002 | Ponte | |
| 6,356,922 B1 * | 3/2002 | Schilit et al. | 715/236 |
| 6,360,215 B1 * | 3/2002 | Judd et al. | |
| 6,363,392 B1 | 3/2002 | Halstead et al. | |
| 6,366,950 B1 | 4/2002 | Scheussler et al. | |
| 6,370,497 B1 * | 4/2002 | Knowles | 704/1 |
| 6,374,246 B1 | 4/2002 | Matsuo | |
| 6,374,290 B1 | 4/2002 | Scharber et al. | |
| 6,381,593 B1 * | 4/2002 | Yano et al. | |
| 6,389,127 B1 | 5/2002 | Vardi et al. | |
| 6,389,372 B1 | 5/2002 | Glance et al. | |
| 6,393,464 B1 | 5/2002 | Dieterman | |
| 6,400,381 B1 | 6/2002 | Barrett et al. | |
| 6,400,845 B1 | 6/2002 | Volino | |
| 6,405,035 B1 | 6/2002 | Singh | |
| 6,405,249 B1 | 6/2002 | Matsuda et al. | |
| 6,408,316 B1 * | 6/2002 | Himmel et al. | 715/206 |
| 6,415,318 B1 | 7/2002 | Aggarwal et al. | |
| 6,421,439 B1 | 7/2002 | Liffick | |
| 6,421,709 B1 | 7/2002 | McCormick et al. | |
| 6,424,828 B1 | 7/2002 | Collins et al. | |
| 6,425,012 B1 | 7/2002 | Trovato et al. | |
| 6,430,344 B1 | 8/2002 | Dixon et al. | |
| 6,430,604 B1 | 8/2002 | Ogle et al. | |
| 6,434,601 B1 | 8/2002 | Rollins | |
| 6,442,546 B1 | 8/2002 | Biliris et al. | |
| 6,446,112 B1 | 9/2002 | Bunney et al. | |
| 6,449,344 B1 | 9/2002 | Goldfinger et al. | |
| 6,449,634 B1 | 9/2002 | Capiel | |

(56) References Cited

U.S. PATENT DOCUMENTS

| | | | |
|---|---|---|---|
| 6,463,461 B1 | 10/2002 | Hanson et al. | |
| 6,467,080 B1* | 10/2002 | Devine et al. | 717/123 |
| 6,480,885 B1 | 11/2002 | Olivier | |
| 6,484,196 B1 | 11/2002 | Maurille | |
| 6,493,692 B1* | 12/2002 | Kobayashi et al. | 706/46 |
| 6,493,705 B1* | 12/2002 | Kobayashi et al. | |
| 6,501,834 B1 | 12/2002 | Milewski et al. | |
| 6,505,197 B1* | 1/2003 | Sundaresan et al. | |
| 6,507,845 B1 | 1/2003 | Cohen et al. | |
| 6,507,866 B1 | 1/2003 | Barchi | |
| 6,519,602 B2* | 2/2003 | Sundaresan et al. | |
| 6,525,747 B1 | 2/2003 | Bezos | |
| 6,526,400 B1* | 2/2003 | Takata et al. | |
| 6,529,475 B1 | 3/2003 | Wan et al. | |
| 6,535,586 B1 | 3/2003 | Cloutier et al. | |
| 6,539,421 B1 | 3/2003 | Appelman et al. | |
| 6,545,722 B1 | 4/2003 | Schultheiss et al. | |
| 6,546,002 B1 | 4/2003 | Kim | |
| 6,549,937 B1 | 4/2003 | Auerbach et al. | |
| 6,557,027 B1 | 4/2003 | Cragun | |
| 6,559,863 B1 | 5/2003 | Megiddo | |
| 6,564,248 B1 | 5/2003 | Budge et al. | |
| 6,564,261 B1 | 5/2003 | Gudjonsson et al. | |
| 6,567,801 B1* | 5/2003 | Chiang et al. | |
| 6,571,234 B1 | 5/2003 | Knight et al. | |
| 6,574,599 B1 | 6/2003 | Lim et al. | |
| 6,580,790 B1 | 6/2003 | Henry et al. | |
| 6,584,469 B1* | 6/2003 | Chiang et al. | |
| 6,587,691 B1 | 7/2003 | Granstam et al. | |
| 6,606,647 B2 | 8/2003 | Shah et al. | |
| 6,615,241 B1 | 9/2003 | Miller et al. | |
| 6,618,747 B1 | 9/2003 | Flynn et al. | |
| 6,636,733 B1 | 10/2003 | Helferich | |
| 6,640,230 B1 | 10/2003 | Alexander et al. | |
| 6,651,058 B1* | 11/2003 | Sundaresan et al. | |
| 6,654,683 B2 | 11/2003 | Jin et al. | |
| 6,654,741 B1* | 11/2003 | Cohen et al. | |
| 6,658,623 B1* | 12/2003 | Schilit et al. | 715/208 |
| 6,665,665 B1* | 12/2003 | Ponte | |
| 6,671,508 B1 | 12/2003 | Mitsuoka et al. | |
| 6,671,714 B1 | 12/2003 | Weyer | |
| 6,677,968 B1 | 1/2004 | Appelman | |
| 6,677,976 B2 | 1/2004 | Parker et al. | |
| 6,678,719 B1 | 1/2004 | Stimmel | |
| 6,685,475 B1* | 2/2004 | Maruyama et al. | 434/118 |
| 6,691,162 B1 | 2/2004 | Wick | |
| 6,697,807 B2 | 2/2004 | McGeachie | |
| 6,701,348 B2 | 3/2004 | Sommerer | |
| 6,714,791 B2 | 3/2004 | Friedman | |
| 6,714,793 B1 | 3/2004 | Carey et al. | |
| 6,718,313 B1 | 4/2004 | Lent et al. | |
| 6,731,308 B1 | 5/2004 | Tang et al. | |
| 6,732,155 B2 | 5/2004 | Meek | |
| 6,738,822 B2 | 5/2004 | Fukasawa et al. | |
| 6,747,970 B1 | 6/2004 | Lamb et al. | |
| 6,748,421 B1 | 6/2004 | Ozkan et al. | |
| 6,750,881 B1 | 6/2004 | Appelman | |
| 6,751,777 B2* | 6/2004 | Bates et al. | 715/206 |
| 6,757,365 B1 | 6/2004 | Bogard | |
| 6,757,732 B1 | 6/2004 | Sollee et al. | |
| 6,763,373 B2 | 7/2004 | Shiigi | |
| 6,772,188 B1 | 8/2004 | Cloutier | |
| 6,772,196 B1 | 8/2004 | Kirsch et al. | |
| 6,781,608 B1 | 8/2004 | Crawford | |
| 6,785,554 B1 | 8/2004 | Amerga | |
| 6,785,681 B2 | 8/2004 | Keskar et al. | |
| 6,788,769 B1 | 9/2004 | Waites | |
| 6,795,853 B1 | 9/2004 | Snover | |
| 6,795,863 B1 | 9/2004 | Doty, Jr. | |
| 6,799,039 B2 | 9/2004 | Wu et al. | |
| 6,800,031 B2 | 10/2004 | Di Cesare | |
| 6,807,574 B1 | 10/2004 | Partovi et al. | |
| 6,834,276 B1* | 12/2004 | Jensen et al. | |
| 6,839,737 B1 | 1/2005 | Friskel | |
| 6,857,006 B1 | 2/2005 | Nishizawa | |
| 6,862,710 B1* | 3/2005 | Marchisio | 715/206 |
| 6,879,665 B1 | 4/2005 | Cook et al. | |
| 6,901,559 B1 | 5/2005 | Blum et al. | |
| 6,904,026 B1 | 6/2005 | Tarnanen et al. | |
| 6,907,243 B1 | 6/2005 | Patel | |
| 6,912,563 B1 | 6/2005 | Parker et al. | |
| 6,912,564 B1 | 6/2005 | Appelman et al. | |
| 6,917,965 B2 | 7/2005 | Gupta et al. | |
| 6,920,478 B2 | 7/2005 | Mendiola et al. | |
| 6,941,345 B1 | 9/2005 | Kapil et al. | |
| 6,952,279 B1 | 10/2005 | Iida | |
| 6,968,179 B1 | 11/2005 | De Vries | |
| 6,975,719 B1 | 12/2005 | Gao et al. | |
| 6,976,209 B1* | 12/2005 | Storisteanu et al. | 715/201 |
| 6,993,564 B2 | 1/2006 | Whitten, II | |
| 6,996,520 B2 | 2/2006 | Levin | |
| 7,003,719 B1* | 2/2006 | Rosenoff et al. | 715/205 |
| 7,035,865 B2 | 4/2006 | Doss et al. | |
| 7,035,923 B1 | 4/2006 | Yoakum et al. | |
| 7,039,676 B1 | 5/2006 | Day et al. | |
| 7,043,530 B2 | 5/2006 | Isaacs et al. | |
| 7,058,036 B1 | 6/2006 | Yu et al. | |
| 7,058,690 B2 | 6/2006 | Maehiro | |
| 7,065,186 B1 | 6/2006 | Myers et al. | |
| 7,076,546 B1* | 7/2006 | Bates et al. | 709/224 |
| 7,082,047 B2 | 7/2006 | Chow | |
| 7,082,407 B1 | 7/2006 | Bezos et al. | |
| 7,100,116 B1 | 8/2006 | Shafrir et al. | |
| 7,103,846 B1 | 9/2006 | Shafrir et al. | |
| 7,107,526 B1* | 9/2006 | Weller | 715/206 |
| 7,110,510 B1 | 9/2006 | Shaffer et al. | |
| 7,120,687 B1 | 10/2006 | Tessman, Jr. et al. | |
| 7,120,871 B1* | 10/2006 | Harrington | 715/205 |
| 7,124,123 B1 | 10/2006 | Roskind et al. | |
| 7,127,232 B2 | 10/2006 | O'Neil et al. | |
| 7,143,356 B1 | 11/2006 | Shafrir et al. | |
| 7,149,208 B2 | 12/2006 | Mattaway et al. | |
| 7,165,213 B1 | 1/2007 | Busey et al. | |
| 7,171,473 B1 | 1/2007 | Eftis et al. | |
| 7,177,880 B2 | 2/2007 | Ruvolo | |
| 7,185,059 B2 | 2/2007 | Daniell et al. | |
| 7,190,956 B2 | 3/2007 | Dorenbosch et al. | |
| 7,200,634 B2 | 4/2007 | Mendiola et al. | |
| 7,202,814 B2 | 4/2007 | Caspi et al. | |
| 7,222,156 B2 | 5/2007 | Gupta et al. | |
| 7,233,948 B1 | 6/2007 | Shamoon et al. | |
| 7,233,992 B1 | 6/2007 | Muldoon et al. | |
| 7,263,526 B1 | 8/2007 | Busey et al. | |
| 7,275,206 B1* | 9/2007 | Bates et al. | 715/205 |
| 7,275,215 B2 | 9/2007 | Werndorfer et al. | |
| 7,277,912 B2 | 10/2007 | Corboy et al. | |
| 7,313,760 B2 | 12/2007 | Grossman et al. | |
| 7,366,764 B1 | 4/2008 | Vollebregt | |
| 7,436,780 B2 | 10/2008 | Stephens et al. | |
| 7,437,413 B2 | 10/2008 | Okuyama et al. | |
| 7,512,407 B2 | 3/2009 | Wu et al. | |
| 7,512,652 B1 | 3/2009 | Appelman et al. | |
| 7,525,951 B2 | 4/2009 | Musil et al. | |
| 7,603,411 B1 | 10/2009 | Davies et al. | |
| 7,620,722 B1 | 11/2009 | Ruparel | |
| 7,686,693 B2 | 3/2010 | Danieli et al. | |
| 7,765,484 B2 | 7/2010 | Roskind | |
| 7,949,722 B1* | 5/2011 | Ullman et al. | 709/217 |
| 7,979,802 B1 | 7/2011 | Appelman | |
| 8,001,190 B2 | 8/2011 | Bernstein | |
| 8,122,363 B1 | 2/2012 | Appelman | |
| 8,132,110 B1 | 3/2012 | Appelman et al. | |
| 8,275,661 B1* | 9/2012 | Ponte et al. | 705/14.54 |
| 8,474,628 B1 | 7/2013 | Appelman | |
| 2001/0005861 A1 | 6/2001 | Mousseau et al. | |
| 2001/0013050 A1 | 8/2001 | Shah | |
| 2001/0044828 A1 | 11/2001 | Kikinis | |
| 2002/0015061 A1 | 2/2002 | Maguire | |
| 2002/0021307 A1 | 2/2002 | Glenn et al. | |
| 2002/0023132 A1 | 2/2002 | Tornabene et al. | |
| 2002/0023134 A1 | 2/2002 | Roskowski et al. | |
| 2002/0028595 A1 | 3/2002 | Higashi et al. | |
| 2002/0042816 A1 | 4/2002 | Bae | |
| 2002/0049717 A1 | 4/2002 | Routtenberg et al. | |

(56) References Cited

U.S. PATENT DOCUMENTS

| | | |
|---|---|---|
| 2002/0056123 A1 | 5/2002 | Liwerant et al. |
| 2002/0065856 A1 | 5/2002 | Kisiel |
| 2002/0065894 A1 | 5/2002 | Dalal et al. |
| 2002/0069223 A1* | 6/2002 | Goodisman et al. ......... 707/513 |
| 2002/0077080 A1 | 6/2002 | Greene |
| 2002/0083136 A1 | 6/2002 | Whitten, II |
| 2002/0091667 A1 | 7/2002 | Jaipuria et al. |
| 2002/0099779 A1 | 7/2002 | Scheussler et al. |
| 2002/0103801 A1 | 8/2002 | Lyons |
| 2002/0112181 A1 | 8/2002 | Smith |
| 2002/0116336 A1 | 8/2002 | Diacakis et al. |
| 2002/0116463 A1 | 8/2002 | Hart |
| 2002/0116641 A1 | 8/2002 | Mastrianni |
| 2002/0130904 A1 | 9/2002 | Becker et al. |
| 2002/0133292 A1 | 9/2002 | Miyaki |
| 2002/0133369 A1 | 9/2002 | Johnson |
| 2002/0147777 A1 | 10/2002 | Hackbarth et al. |
| 2002/0154210 A1 | 10/2002 | Ludwig et al. |
| 2002/0174010 A1 | 11/2002 | Rice, III |
| 2002/0175953 A1 | 11/2002 | Lin |
| 2002/0181703 A1 | 12/2002 | Logan et al. |
| 2002/0184089 A1 | 12/2002 | Tsou et al. |
| 2002/0193942 A1 | 12/2002 | Odakura et al. |
| 2002/0199095 A1 | 12/2002 | Bandini et al. |
| 2003/0004855 A1 | 1/2003 | Dutta et al. |
| 2003/0004872 A1 | 1/2003 | Gardi et al. |
| 2003/0009385 A1 | 1/2003 | Tucciarone et al. |
| 2003/0009523 A1 | 1/2003 | Lindskog et al. |
| 2003/0012348 A1 | 1/2003 | Skladman et al. |
| 2003/0018726 A1 | 1/2003 | Low et al. |
| 2003/0023875 A1 | 1/2003 | Hursey et al. |
| 2003/0028524 A1 | 2/2003 | Keskar et al. |
| 2003/0028595 A1 | 2/2003 | Vogt et al. |
| 2003/0037112 A1 | 2/2003 | Fitzpatrick |
| 2003/0043201 A1 | 3/2003 | Abdelhadi et al. |
| 2003/0046198 A1 | 3/2003 | Knapp et al. |
| 2003/0050916 A1 | 3/2003 | Ortega et al. |
| 2003/0069874 A1 | 4/2003 | Hertzog et al. |
| 2003/0079024 A1* | 4/2003 | Hough et al. ................. 709/227 |
| 2003/0084103 A1 | 5/2003 | Weiner et al. |
| 2003/0093580 A1 | 5/2003 | Thomas et al. |
| 2003/0097361 A1 | 5/2003 | Huang et al. |
| 2003/0105822 A1 | 6/2003 | Gusler et al. |
| 2003/0131061 A1 | 7/2003 | Newton et al. |
| 2003/0140103 A1 | 7/2003 | Szeto et al. |
| 2003/0165219 A1 | 9/2003 | Bedingfield et al. |
| 2003/0167324 A1 | 9/2003 | Farnham et al. |
| 2003/0182394 A1 | 9/2003 | Ryngler et al. |
| 2003/0187813 A1 | 10/2003 | Goldman et al. |
| 2003/0212804 A1 | 11/2003 | Hashemi |
| 2003/0217073 A1* | 11/2003 | Walther et al. ............ 707/104.1 |
| 2003/0225834 A1 | 12/2003 | Lee et al. |
| 2003/0225847 A1 | 12/2003 | Heikes et al. |
| 2003/0236835 A1 | 12/2003 | Levi et al. |
| 2004/0015548 A1 | 1/2004 | Lee |
| 2004/0017396 A1 | 1/2004 | Werndorfer et al. |
| 2004/0039779 A1 | 2/2004 | Amstrong et al. |
| 2004/0054729 A1 | 3/2004 | Fukuizumi et al. |
| 2004/0056901 A1 | 3/2004 | March et al. |
| 2004/0117443 A1 | 6/2004 | Barsness |
| 2004/0122681 A1 | 6/2004 | Ruvolo |
| 2004/0122810 A1 | 6/2004 | Mayer |
| 2004/0122855 A1 | 6/2004 | Ruvolo |
| 2004/0128356 A1 | 7/2004 | Bernstein et al. |
| 2004/0179039 A1 | 9/2004 | Blattner et al. |
| 2004/0186738 A1 | 9/2004 | Reisman |
| 2004/0193722 A1 | 9/2004 | Donovan |
| 2004/0210844 A1 | 10/2004 | Pettnati et al. |
| 2004/0215648 A1 | 10/2004 | Marshall |
| 2004/0215721 A1 | 10/2004 | Szeto et al. |
| 2004/0249899 A1 | 12/2004 | Shiigi |
| 2004/0260762 A1 | 12/2004 | Fish |
| 2005/0015432 A1 | 1/2005 | Cohen |
| 2005/0021750 A1 | 1/2005 | Abrams |
| 2005/0027382 A1 | 2/2005 | Kirmse et al. |
| 2005/0027716 A1 | 2/2005 | Apfel |
| 2005/0038856 A1 | 2/2005 | Krishnasamy et al. |
| 2005/0043989 A1 | 2/2005 | Shifrin |
| 2005/0044152 A1 | 2/2005 | Hardy et al. |
| 2005/0050143 A1 | 3/2005 | Gusler et al. |
| 2005/0060377 A1 | 3/2005 | Lo et al. |
| 2005/0076241 A1 | 4/2005 | Appelman |
| 2005/0080863 A1 | 4/2005 | Daniell |
| 2005/0086211 A1 | 4/2005 | Mayer |
| 2005/0102202 A1 | 5/2005 | Linden et al. |
| 2005/0114229 A1 | 5/2005 | Ackley et al. |
| 2005/0153681 A1 | 7/2005 | Hanson |
| 2005/0197846 A1 | 9/2005 | Pezaris |
| 2005/0198173 A1 | 9/2005 | Evans |
| 2006/0075044 A1 | 4/2006 | Fox et al. |
| 2006/0167991 A1 | 7/2006 | Heikes et al. |
| 2006/0168054 A1 | 7/2006 | Burkhart et al. |
| 2006/0173824 A1 | 8/2006 | Bensky et al. |
| 2006/0173963 A1 | 8/2006 | Roseway et al. |
| 2006/0182248 A1 | 8/2006 | Smith et al. |
| 2006/0212561 A1 | 9/2006 | Feng |
| 2006/0277187 A1 | 12/2006 | Roese et al. |
| 2007/0156664 A1 | 7/2007 | Norton et al. |
| 2008/0082620 A1 | 4/2008 | Barsness |
| 2008/0222533 A1 | 9/2008 | Hankejh et al. |
| 2009/0089316 A1 | 4/2009 | Kogan et al. |
| 2010/0184517 A1 | 7/2010 | Danieli et al. |
| 2011/0231507 A1 | 9/2011 | Appelman |
| 2012/0030295 A1 | 2/2012 | Bernstein |
| 2012/0144310 A1 | 6/2012 | Appelman |
| 2013/0054712 A1 | 2/2013 | Appelman |
| 2013/0067339 A1 | 3/2013 | Appelman |
| 2013/0067340 A1 | 3/2013 | Appelman |
| 2013/0067341 A1 | 3/2013 | Appelman |
| 2013/0073645 A1 | 3/2013 | Appelman |
| 2013/0073646 A1 | 3/2013 | Appelman |
| 2013/0073647 A1 | 3/2013 | Appelman |
| 2013/0073648 A1 | 3/2013 | Appelman |
| 2013/0073651 A1 | 3/2013 | Appelman |
| 2013/0073652 A1 | 3/2013 | Appelman |
| 2013/0124650 A1 | 5/2013 | Bernstein |
| 2013/0332957 A1 | 12/2013 | DeWeese et al. |
| 2015/0113440 A1 | 4/2015 | Appelman |
| 2015/0222575 A1 | 8/2015 | Appelman |
| 2016/0294740 A1 | 10/2016 | Bernstein |
| 2016/0301654 A1 | 10/2016 | Bernstein |
| 2016/0380934 A1 | 12/2016 | Appelman |

FOREIGN PATENT DOCUMENTS

| | | |
|---|---|---|
| GB | 2319137 | 5/1998 |
| GB | 2357932 | 7/2001 |
| GB | 2368747 | 5/2002 |
| JP | 8-314826 | 11/1996 |
| JP | 2000-049901 | 2/2000 |
| JP | 2000-259514 | 9/2000 |
| JP | 2000-284999 | 10/2000 |
| JP | 2001-084320 | 3/2001 |
| WO | WO 97/10558 | 3/1997 |
| WO | WO 97/14234 | 4/1997 |
| WO | WO 97/46955 | 12/1997 |
| WO | WO 98/16045 | 4/1998 |
| WO | WO 98/47270 | 10/1998 |
| WO | WO 99/08434 | 2/1999 |
| WO | WO 99/34628 | 7/1999 |
| WO | WO 99/48011 | 9/1999 |
| WO | WO 00/16201 | 3/2000 |
| WO | WO 00/24154 | 4/2000 |
| WO | WO 00/60809 | 10/2000 |
| WO | WO 00/79396 | 12/2000 |
| WO | WO 01/06748 | 1/2001 |
| WO | WO 01/22258 | 3/2001 |
| WO | WO 01/24036 | 4/2001 |
| WO | WO 01/43357 | 5/2001 |
| WO | WO 01/67787 | 9/2001 |
| WO | WO 01/72020 | 9/2001 |
| WO | WO 01/80079 | 10/2001 |
| WO | WO 02/03216 | 1/2002 |
| WO | WO 02/09437 | 1/2002 |

(56) References Cited

FOREIGN PATENT DOCUMENTS

| WO | WO 02/35781 | 5/2002 |
|---|---|---|
| WO | WO 02/062039 | 8/2002 |
| WO | WO 02/073886 | 9/2002 |
| WO | WO 2004/028178 | 4/2004 |
| WO | WO 2005/086723 | 9/2005 |

OTHER PUBLICATIONS

International Search Report issued in PCT/US01/20381, dated Dec. 4, 2002.
U.S. Appl. No. 09/843,788, Mar. 11, 2008, Notice of Allowance.
U.S. Appl. No. 10/311,259, Jan. 25, 2007, Office Action.
U.S. Appl. No. 10/311,259, Apr. 16, 2007, Office Action.
U.S. Appl. No. 10/311,259, Dec. 12, 2007, Office Action.
U.S. Appl. No. 10/311,259, Mar. 19, 2008, Office Action.
U.S. Appl. No. 10/311,259, Oct. 16, 2008, Office Action.
U.S. Appl. No. 10/311,259, Apr. 27, 2009, Office Action.
U.S. Appl. No. 10/311,259, Nov. 25, 2009, Office Action.
U.S. Appl. No. 10/311,259, Mar. 18, 2010, Office Action.
U.S. Appl. No. 10/311,259, Sep. 7, 2010, Office Action.
U.S. Appl. No. 10/311,259, Dec. 22, 2010, Office Action.
U.S. Appl. No. 10/311,259, Apr. 5, 2011, Notice of Allowance.
U.S. Appl. No. 13/149,368, Jul. 7, 2014, Office Action.
U.S. Appl. No. 13/149,368, Oct. 24, 2014, Office Action.
U.S. Appl. No. 13/175,410, Dec. 20, 2011, Office Action.
U.S. Appl. No. 13/175,410, Apr. 3, 2012, Office Action.
U.S. Appl. No. 13/175,410, Aug. 10, 2012, Office Action.
U.S. Appl. No. 13/175,410, Apr. 1, 2013, Office Action.
U.S. Appl. No. 13/175,410, Jul. 1, 2013, Office Action.
U.S. Appl. No. 13/175,410, Oct. 10, 2013, Office Action.
U.S. Appl. No. 13/396,132, Sep. 11, 2014, Office Action.
U.S. Appl. No. 13/397,568, Dec. 5, 2013, Office Action.
U.S. Appl. No. 13/397,568, Jun. 6, 2014, Office Action.
U.S. Appl. No. 13/397,568, Oct. 6, 2014, Notice of Allowance.
U.S. Appl. No. 13/616,734, Oct. 24, 2013, Office Action.
U.S. Appl. No. 13/617,413, Oct. 24, 2013, Office Action.
U.S. Appl. No. 13/616,666, Feb. 14, 2014, Office Action.
U.S. Appl. No. 13/616,666, Aug. 13, 2014, Office Action.
U.S. Appl. No. 13/616,678, Oct. 4, 2013, Office Action.
U.S. Appl. No. 13/616,678, Dec. 4, 2013, Advisory Action.
U.S. Appl. No. 13/616,678, Dec. 24, 2013, Office Action.
U.S. Appl. No. 13/616,678, Sep. 2, 2014, Office Action.
U.S. Appl. No. 13/620,985, Jun. 17, 2013, Office Action.
U.S. Appl. No. 13/620,985, Nov. 8, 2013, Office Action.
U.S. Appl. No. 13/620,985, Mar. 12, 2014, Office Action.
U.S. Appl. No. 13/620,985, Sep. 19, 2014, Office Action.
U.S. Appl. No. 09/843,788, filed Apr. 30, 2001, Appelman.
"AOL technology: turning complicated things into engaging services", 1996 Annual Report, 22 pages.
"Yahoo! Messenger Makes the World a Little Smaller, More Informed", pp. 1-2, Jun. 21, 1999.
Alan Cohen, "Instant Messaging", Apr. 13, 1999, PC Magazine, PC Labs, 2 pages.
"AOL Instant Messenger Windows Beta Features", Jun. 24, 1999, 2 pgs, AOL Instant Messenger All New Version 2.0,2 pages, Jun. 24, 1999, What is AOL Instant Messenger, 3 pages, Jun. 24, 1999, Quick Tips for Getting Started, 5 pages, Jun. 24, 1999, Frequently Asked Questions About AOL Instant Messenger, 6 pages, Jun. 24, 1999.
"What's new about exchanging information over the Internet," Outlook 2000 SR-1 (9.0.0.4527) Help File, on or before Aug. 10, 2001, p. 1.
"About Internet directory services," Outlook 2000 SR-1 (9.0.0.4527) Help File, on or before Aug. 10, 2001, p. 1.
"Set up LDAP directory services," Outlook 2000 SR-1 (9.0.0.4527) Help File, on or before Aug. 10, 2001, p. 1.
"Look up contact information from an item," Outlook 2000 SR-1 (9.0.0.4527) Help File, on or before Aug. 10, 2001, p. 1.

J.C. Cannon, "Design Guide for Directory-Enabled Applications," [online], Apr. 2001 [retrieved on May 13, 2003]. Retrieved from the Internet <http://msdn.microsoft.com/library/en-us/dnactdir/html/deal.asp?frame=true>, pp. 1-18.
Microsoft Corporation, "Using ADSI, LDAP, and Network Management Functions With Active Directory," [online], Feb. 2002 [retrieved on May 13, 2003]. Retrieved from the Internet <http://msdn.microsoft.com/library/en-us/dnactdir/html/BuildingADApps.asp?frame=true>, pp. 1-9.
Microsoft Corporation, "Comparing Microsoft Active Directory to Novell's NDS," [online],Sep. 1998 [retrieved on May 13, 2003]. Retrieved from the Internet <http://msdn.microsoft.comllibrary/en-us/dnactdir/html/msdnactivedirvsnds.asl2?frame=true>, pp. 1-17.
Microsoft Corporation, "Active Directory Services Interface in the Microsoft Exchange 5.5 Environment," [online], Nov. 1997 [retrieved on May 13, 2003). Retrieved from the Internet <http://nnsdn.microsoft.com/library/en-us/dnactdir/html/msdn_adsiexch.asp?frame=true>, pp. 1-12.
"Active Directory Service Overview," [online], Nov. 30, 2001 [retrieved on May 13, 2003]. Retrieved from the Internet <http://www.microsoft.com/windows2000/server/evaluation/business/addatasheet.asp>, pp. 1-5.
"Integrating Microsoft Metadirectory Services and Active Directory," [online], Aug. 31, 2000 [retrieved on May 13, 2003]. Retrieved from the Internet <http://www.microsoft.comlwindows2000/server/evaluation/news/bulletins/mmsma.asp>, p. 1.
"Benefits of Active Directory in a Windows 2000 Environment," [online], Sep. 20, 2001, [retrieved on May 13, 2003] Retrieved from the Internet <http://www.microsoft.com/windows2000/server/evaluation/business/adwin2k.asp>, pp. 1-9.
"Active Directory," [online], [retrieved on May 13, 2003] Retrieved from the Internet <http://www.microsoft.com/windows2000/technologies/directory/AD/default.asp>, pp. 1-13.
Microsoft Corporation, "Introduction to Active Directory Application Mode," Microsoft Windows Server 2003, Aug. 2002, pp. 1-13.
"Active Directory Features," [online], Jun. 15, 1999 [retrieved on May 13, 2003]. Retrieved from the Internet <http://www.microsoft.com/windows2000/server/evaluation/features/adlist.asp>, pp. 1-4.
"Windows 2000 Directory Services," [online], [retrieved on May 13, 2003]. Retrieved from the Internet <http://www.microsoft.com/windows2000/technologies/directory/default.asp>, p. 1-2.
"Directory Integration Can Lower Total Cost of Ownership and Increase Application Functionality," [online], Jul. 27, 1998 [retrieved on May 13, 2003]. Retrieved from the Internet <http://www.microsoft.com/presspass/press/1998/Jul98/ActivDPR.asp>, pp. 1-4.
William R. Stanek, Microsoft Windows 2000 Administrator's Pocket Consultant [online]. Microsoft Corporation, 1999 [retrieved on May 8, 2003]. Retrieved from the Internet <http://www.microsoft.com/technet/prodtechnol/ad/windows2000/evaluate/05w2kada.asp?fr . . . >, pp. 1-6.
"Enterprise Identity Management with Windows 2000 and Active Directory," [online], 1999 [retrieved on May 13, 2003]. Retrieved from the Internet <http://www.microsoft.com/technet/prodtechnol/ad/windows2000/evaluate/w2keims.asp?fra . . . >, pp. 1-16.
"Integrating Applications with Windows 2000 and Active Directory," [online], Oct. 2000 [retrieved on May 8, 2003]. Retrieved from the Internet <http://www.microsoft.com/technet/prodtechnol/ad/windows2000/evaluate/adappstr.asp?fra . . . >, pp. 1-12.
"Part I: Active Directory Operations," Active Directory Operations Guide, Microsoft Corporation, Microsoft Windows 2000, Version 1.5, pp. 1-187.
"Part II: Tasks and Procedures Appendices," Active Directory Operations Guide, Microsoft Corporation, Microsoft Windows 2000, Version 1.5, pp. 1-131.
Eschenburg, Wo laufen sie denn?, Oct. 26, 1998, pp. 92-95.
Kohda et al., IMPP: A New Instant Messaging Standard and Its Impact on Internet Business, Dec. 2000, Fujitsu Sci. Tech. J., 36, 2 pp. 147-153.
International Search Report for International Application No. PCT/US03/15715 mailed Aug. 14, 2003.

(56) References Cited

OTHER PUBLICATIONS

"The LP Wireless Messenger", Messenger Documentation, [online]. LP Wireless, Inc., 2001 [retrieved on Nov. 2, 2002]. Retrieved from the Internet <http://www.lpwireless.com/messengerhelp.htm>, pp. 1-7.
European Search Report mailed Aug. 30, 2005 for European Application No. 03731244.
"Introducing the Gordano Messaging Suite"; http://www.gordano.com; Copyright 1994-2003 Gordano.
McKendrick, Joseph; "Internet Call Centers: New Era in Customer Service"; Feb. 2002; V. 10, N. 2, pp. 22(4).
Ed Bott and Ron Person, Using Windows 95 with Internet Explorer 4.0, Feb. 17, 1998, Que, Special Edition.
America Online Inc., "New AIM 4.7," Sep. 27, 2001, Internet: http://aim.aol.com.
America Online Inc., "AOL Instant Messenger", Aug. 29, 2000, Internet: www.aol.com/aim/.
CNET Networks Inc., "PopUp Killer", Sep. 13, 2001, Internet: download.cnet.com/downloads/0-10059-100-6932612.html.
WebmasterWorld.com Inc., "HTML and Browsers", Mar. 5, 2001, Internet: www.webmaster.com/forum21/367.htm.
"AOL Instant Messenger All New Version 2.0", 2 pages, Jun. 24, 1999.
"Frequently Asked Questions About AOL Instant Messenger", 6 pages, Jun. 24, 1999.
New Features in AOL Instant Messenger for Windows v. 2.01 Beta, 2 pages, Apr. 28, 1999.
"Quick Tips for Getting Started", 5 pages, Jun. 24, 1999.
"Using Active Directory Service", from Chapter 5, Microsoft Windows 2000 Administrator's Pocket Consultant, by William R. Stanek (1999). Retrieved from http://www.microsoft.com/technet/12rodtechnol/ad/windows2000/evaluate/05w2kadb.asp?fr . . . , pp. 1-6.
"What is AOL Instant Messenger", 3 pages, Jun. 24, 1999.
"Working with Active Directory Domains", from Chapter 5, Microsoft Windows 2000 Administrator's Pocket Consultant, by William R. Stank (1999). Retrieved from http://www.microsoft.com/technet/prodtechnol/ad/windows2000/evaluate/05w2kadb.asp?fr . . . , pp. 1-10.
"A Countermeasure to Duplicate-detecting Anti-spam Techniques," Robert J. Hall, AT&T Labs Technical Report 99.9.1,1999, Abst. and pp. 1-26.
"A Reputation System for Peer-to-Peer Networks," Gupta et al., Jun. 1-3, 2003, NOSSDAV'03, Monterey, California, pp. 144-152.
"About File Transfers", AOL Instant Messenger, version 4.3, Help Documentation, available on Jul. 21, 2001, 5 pages.
"AOL Instant Messenger", reprinted from http://web.archive.org/web/20010721193059/http://aim.com/ (Way Back Machine_available on Jul. 21, 2001) on Aug. 26, 2005, 7 pages.
"BestCalls.com Announces the BestCalls Technology Index," Business Wire, Jun. 30, 1999, Business Wire, p. 2.
"Better Bayesian Filtering," Paul Graham, Jan. 2003, pp. 1-11, http://www.paulgraham.co/better.html.
"Business at Cyberspeed; Brainstorm Becomes Quick Internet Hit," Walker, Jan. 24, 1999, The Washington Post, p. A.01 (4 total pages).
"Degrees of Separation Email Spam Protection," Halfbakery: Degrees of Separation Email Spam Protection, reprinted from http://halfbakery.com/idea/Degrees_20of_20Separation_20Emaii_20Protecti . . . printed on Mar. 1, 2004 (3 pages).
"Digital Artifacts for Remembering and Storytelling: Post History and Social Network Fragments," Viegas et al., retrieved from World Wide Web: http://we.media.mit.edu/~fviegas/papers/posthistorysnf.pdf, 10 total pages (Jan. 2004).
"Finding Others Online: Reputation Systems for Social Online Spaces," Carlos Jensen et al., Apr. 20-25, 2002, CHI, Minneapolis, Minnesota, vol. 4, Issue 1, pp. 447-454.
"GLWebMail 2.0 is released!" http://www.gordano.com; available on Apr. 18, 2001, reprinted from http://web.archive org/web/20010418153714//http://www.gordano.com , 2 pages.
"Hottie or Nottie? Web Site Voters Let You Know Whether You Sizzle or Fizzle," Marino, Jul. 11, 2001, Florida Times Union, 2 pages.
"Icq.anywhere, Email Features—Email Center—ICQ.com," retrieved Apr. 29, 2004 from the World Wide Web: http://www.icq.com/email/popular-features.html, pp. 1-5.
"Idea for Online Networking Brings Two Entrepreneurs Together," Patents: Idea for Online Networking Brings Two Entrepreneurs Together, reprinted from http://www.nytimes.com/2003/12/01/technology/01patt.html?adxnnlx=0&adxnnlx=107029 . . . , printed on Nov. 5, 2004, 2 pages.
"Instant Messaging for Gamers," PC Gamer, May 2004, vol. 11, No. 5, (2 pages).
"Learning Spam: Simple Techniques for Freely-Available Software," Bart Massey et al., Computer Science Dept., Portland, OR USA, 2003, pp. 1-14.
"Learning to Filter Spam E-Mail: A Comparison of a Naive Bayesian and a Memory-Based Approach," Ion Adroutsopoulos et al., University of Athens, Sep. 2000, pp. 1-12.
"Lotus Instant Messaging Everyplace FAQ," retrieved Apr. 29, 2004 from the World Wide Web: http://www.lotus.com/products/product4.nsf/wdocs/249c6f083166cd3e85256d7300714407, pp. 1-3.
"PieSpy—Inferring and Visualizing Social Network on IRC," PieSpy Social Network Bot, reprinted from http://lister.linux-srv.anix.net/piespy printed on Mar. 11, 2004 (18 pages).
"Plaxo," Plaxo, reprinted from http://web.archive.org/web/20041105072256/http://www.plaxo.com/ printed on Nov. 5, 2004 (available on Feb. 14, 2004) (2 pages).
"Plaxo—Update Your Address Book," Plaxo Contact Networks, reprinted from http://web.archive.org/web/20030218233638/http://www.plaxo.com/ printed on Nov. 5, 2004 (available on Feb. 18, 2003)(1 page).
"Reflections on Friendster, Trust and Intimacy," Danah Boyd. Ubicomp 2003, Workshop Application for the Intimate Ubiquitous Computing Workshop. Seattle, WA, Oct. 12-15, 2003, 4 pages.
"Reputation Systems," Resnick et al., Dec. 2000, Communications of the ACM, vol. 43, No. 12, pp. 45-48.
"RIM Road: Software: Internet & Network: Webmessenger RIM J2ME/Instant Messaging: retrieved Apr. 29, 2004 from the World Wide Web: http://www.rimrod.com/software/rim1/Webmessenger-RIM-J2ME-Instant-Messaging-20 . . . " pp. 1-4.
"Six Degrees—New Programs Help Companies 'Mine Workers' Relationships for Key Business Prospects," William M. Bulkeley et al., Marketplace, The Wall Street Journal, Aug. 4, 2003. (3 pages).
"Social Nets Find Friends in VCs." Joanna Glasner. http://www.wired.com/news , Nov. 17, 2003, pp. 1-3.
"Social Network Fragments: An Interactive Tool for Exploring Digital Social Connections." Danah Boyd, Jeff Potter. Sketch at SIGGRAPH 2003. San Diego, California: ACM, Jul. 27-31, 2003, (1 page).
"Social Networking for Business: Release 0.5," Esther Dyson, Esther Dyson's Monthly Report, vol. 21, No. 10; Nov. 25, 2003, www.edventure.com. (36 pages).
"Social Social Networks: Deodorant for the Soul?," Esther Dyson, Esther Dyson's Monthly Report, vol. 21, No. 11, Dec. 12, 2003, www.edventure.com, (36 pages).
"Social Sites Clicking With Investors," Washingtonpost.com: Social Sites Clicking With Investors, reprinted from http://www.washingtonpost.com/ac2/wp-dyn/A32066-2003Nov12?language=printer printed on Nov. 5, 2004 (3 pages).
"Socialware: Multiagent Systems for Supporting Network Communities," Hattori et al., Mar. 1999, Association for Computing Machinery, Communications of the ACM, vol. 42, Issue 3, (6 pages).
"Spoke Builds on Social Networking Patent Portfolio," Spoke Builds on Social Networking Patent Portfolio, reprinted from http://www.internetnews.com/ent-news/print.php/3073621 printed on Nov. 5, 2004 (3 pages).
"Support Vector Machines for Spam Categorization," Harris Drucker et al., IEEE Transactions on Neural Networks, vol. 10, No. 5, Sep. 1999, pp. 1048-1054.
"Support Vector Machines," Marti Hearst, IEEE Intelligent Systems, Jul./Aug. 1998, pp. 18-28.

(56) References Cited

OTHER PUBLICATIONS

"SVM-based Filtering of E-mail Spam with Content-specific Misclassification Costs," Aleksander Kolcz et al., TextDM'2001 (IEEE ICDM—2001 Workshop on Text Mining), San Jose. CA, 2001, pp. 1-14.
"SWF Seeks Attractive Head Shot; To Stand Out, Online Daters Pay for Professional Photos; Cropping out the Ex-Wife," Leiber, Nov. 19, 2003, The Wall Street Journal, (1 page).
"Technical Solutions for Controlling Spam," Shane Hird, Proceedings of Aug. 2002, Melbourne, Sep. 4-6, 2002, (17 pages).
"Technology Journal—Are You Satisfied? EBay's Battle Against Fraud Rests Primarily on a Simple Concept: Customer Feedback," Wingfield, Sep. 23, 2002, Asian Wall Street Journal, p. T.8, (4 total pages).
"Telstra targets Net spammers," J. Dudley, news.com.au, Dec. 2, 2003, (2 pages).
"Text Categorization with Support Vector Machines: Learning with Many Relevant Features," Thorsten Joachims, University of Dortmund, Computer Science Dept., LS-8 Report 23, 1998, (18 pages).
"The first Social Software . . . a true Social Adventure," Huminity-Social Networking, Chat Software, Create Personal Free Blogs and My Group . . . , reprinted from http://www.huminity.com/ printed on Nov. 5, 2004 (2 pages).
Trillian Discussion Forums—HOWTO: import ICQ 2003a Contact List: retrieved Apr. 29, 2004 from the World Wide Web: http://trillian.cc/forums/showthread.php?s+&threadid=36475, pp. 1-2.
"Welcome to Huminity World of Connections," Huminity-Home, reprinted from http://web.archive.org/web/20030228131435/www.huminity. com/default. php?internationa . . . printed on Nov. 5, 2004 (available on Feb. 2103) (1 page).
"Will You Buy a Car From This Man?," Leander Kahney, Oct. 6, 2003. pp. 1-3.
Windows NetMeeting—Features, [Online], Jun. 17, 1999, XP002245623, Retrieved from the Internet: URL:http://www.microsoft.com/windows/NetMeeting/Features/default.ASP>, (8 pages).
Anand Ranganalhan et al., "ConChat: A Context-Aware Chat Program", 2002, Pervasive Computing, pp. 51-57.
Announce: Implementation of E-mail Spam Proposal, Maurice L. Marvin, news.admin.net-abuse.misc, Aug. 3, 1996,2 pages.
Anonymous: "Push to Talk™ Services", Internet Document, [Online], p. 1, Retrieved from the Internet: URL: http://www.nextel.com/services/directconnect/pttoverview.shtml [retrieved on Dec. 29, 2003].
Anonymous: "The Internet—the Advent of New Forms of Communication", Internet Document, [Online], pp. 1-4, Retrieved from the Internet: URL: http://journal.fujitsu.com/248e/e48now.html [retrieved on Dec. 29, 2003].
Archive.org archived "AOL Instant Messenger," [online] Jul. 21, 2001 [from file of U.S. Appl. No. 09/911,799] (7 pages).
Archive.org archived Morpheus 1.9.1 download page on CNet Download.com [online] Oct. 8, 2001 [from file of U.S. Appl. No. 09/911,799] (2 pages).
Archive.org archived MusicCity Morpheus download page on Cnet Download.com [online] Oct. 8, 2001 [from file of U.S. Appl. No. 09/911,799] (2 pages).
Australian Office Action of Apr. 7, 2006, App. No. 2002340039 (2 pages).
BuddyGopher~About, available on Jul. 13, 2004, reprinted from http://web.archive.org/web/20040713002836/www.buddygopher.com/about.html on Sep. 28, 2005 (4 pgs).
BuddyGopher—We Love Away Messages!, "BuddyGopher simultaneously checks the away messages of your favorite AIM® buddies.", available on Sep. 24, 2004, reprinted from http://web.archive.org/web/200409241 04001/http://www.buddygopher.com/ on Sep. 28, 2005 (2 pages).
Canadian Office Action from Application Serial No. 2,403,520, dated Feb. 21, 2005 (2 pages).
Chinese Office Action of Jul. 7, 2006, App. No. 02821420X (5 pages).
International Search Report and Written Opinion dated Feb. 15, 2006 for International Application No. PCT/US05/07204, (10 pages).
European Search Report mailed Aug. 30, 2005 for International Application No. EP03731244 (4 pages).
Office Action mailed approximately Feb. 29, 2006 for Japanese Patent Application No. 2002-515026 (6 pages).
Supplementary European Search Report issued in European Application No. EP05728303, dated Jan. 9, 2009, (2 pages).
Courter et al., "Mastering Microsoft Outlook 2000 Premium Edition", Sybex Inc., Alameda, California, 2000, pp. 167-169, ISBN 0-7821-2676-6.
CrushParty.com: Help, retrieved Jun. 12, 2002 from the World Wide Web: http://www.crushparty.com/help.jsp, (3 pages).
Dodgeball.com:: mobile social software, "help: text messaging", available on Oct. 13, 2004, reprinted from http://web.archive.org/web/20041013034241/www.dodgeball.com/social/helptext.php on Sep. 28, 2005 (3 pgs).
Dodgeball.com:: mobile social software, "help: the basics", available on Oct. 9, 2004, reprinted from http://web.archive.org/web/20041009200739/www.dodgeball.com/social/helpbasics.php on Sep. 28, 2005(2 pgs).
Dodgeball.com:: mobile social software, "help: use it", available on Oct. 9, 2004, reprinted from http://web.archive.ora/web/20041009201853/www.dodgeball.com/social/help useit.php on Sep. 28, 2005(2 pgs).
Dodgeball.com:: mobile social software, "Hook up with friends. Discover what's around you", available on Nov. 30, 2003, reprinted from http://web.archive.org/web/20041130034344/www.dodgeball.com/social/index.phpon Sep. 28, 2005 (2 pgs).
Dutta-Roy Amitava, Virtual Meetings with Desktop Conferencing, IEEE Spectrum, vol. 35, No. 7, Jul. 1, 1998, pp. 47-56 and p. 66.
European Office Action in Application No. 01954931.0-2414, mailed Jul. 14, 2008, 3 pages.
European Patent Office, Communication of Aug. 30, 2005, App. No. 03731244.4-2416 (PCT/US0315715) (4 pages).
European Patent Office, Communication of Aug. 31, 2009, App. No. 02778374.5-1238 (8 pages).
European Patent Office, Communication of Sep. 5, 2006, App. No. 02778374.5-1238 (3 pages).
Examiner's Answer mailed Jan. 11, 2008 in U.S. Appl. No. 09/810,159, 11 pages.
Home-tribe.net, http://washingtondc.tribe.net/message/24434d1b-817b-4580-aa42-3bffa15f26a?page=1, reprinted on Dec. 13, 2004), (2 pages).
http://www.friendster.com (reprinted on Dec. 13, 2004) (17 pages).
IBM "Configuring Sametime servers in your Domino environment" May 1, 2000 (14 pages).
International Search Report and Written Opinion for PCT Application No. PCT/US2005/042992, Mar. 6, 2007 (8 pages).
International Search Report dated Oct. 16, 2006, for PCT/US05/08476, (9 pages).
International Search Report, Application No. PCT/US05/45663, dated Apr. 11, 2008, (10 pages).
Opinion of International Search Authority, Application No. PCT/US05/45663, dated Apr. 11, 2008, (6 pages).
International Search Report, Application Serial No. PCT/US2006/018286, dated Oct. 19, 2006, (10 pages).
Isaacs, Ellen: "Example UI Spec: Sound Instant Messages", Internet Document, [Online], Retrieved from the Internet: URL: http://www.uidesigns.com/spec/d-sims.html [retrieved on Jun. 26, 2003] (2 pages).
Japanese Office Action of May 12, 2008, App. No. 2003-533140 (5 pages).
Klaus Hartenstein et al., "xhtalk 2.9", © Nov. 1992, (6 pages).
Lotus sametime 1.5 1999 (4 pages).
Mariano, Gwendolyn. ZDNetNews. "Morpheus 1.9 to be unleashed", [online] Jun. 10, 2002 [from file of U.S. Appl. No. 09/911,799] (6 pages).

(56) References Cited

OTHER PUBLICATIONS

Mary Beth Marklein, "Student have 'away' with words", Mar. 28, 2004, USA Today, http://www.usatoday.com/tech/news/2004-03-28-aways-messages-usat_x.htm, 4 pages.
Matsumoto, Tatsuro et al.: "Chocoa Communicator—A New Communication System Based on Awareness and Text Communications-", Fujitsu Sci. Tech. J., 36, 2, pp. 154-161, Dec. 2000.
Mike Snider, "America goes online for New Year's bash", USA Today, Jan. 2, 2000 1 page.
Muller, Nathan, "Dial 1-800-Internet"; Feb. 1996, pp. 83-84, 86, 88.
Neo Mai, Ken Neo. "Buying and selling on the internet; [Computimes, 2* Edition]." New Straits Times. Kuala Lumpur: Jun. 28, 2001. 3 pages.
Office Action of Canadian Application No. 2,462,037, dated Feb. 12, 2009 (8 pages).
PCT International Search Report of Apr. 11, 2003, App. No. PCT/US00/35160 (3 pages).
PCT International Search Report of Jan. 9, 2003, App. No. PCT/US02/30730 (5 pages).
PowWow (Mar. 1, 2000), Introduction, Retrieved Apr. 3, 2006 from website: http://web.archive.org/web/20000301125635/ww2.tribal.com/help/online_docs/h205voic.html. (2 pages).
Pruitt, Scarlet. IDG News Service. "Morpheus Updates Peer-to-Peer Client" [online] Jun. 10, 2002 [accessed Feb. 14, 2007], Retrieved from Internet URL.
R. Movva & W. Lai, "MSN Messenger Service 1.0 Protocol", Aug. 1999. Internet Draft. http://tools.ietf.org/id/draft-movva-msn-messenger-protocol-oo.txt, (28 pages).
Reichard, K., "AOL, ICQ to Interoperate—But in a Limited Fashion," Oct. 30, 2002, Instant Messaging Planet, available at www.instantmessagingplanet.com/public/article.php/1490771, (4 pages).
Ryze home page, www.ryze.com, Dec. 21, 2003, available at http://web.archive.org/web/20031221010006/http://ryze.com, printed Mar. 16, 2005, (13 pages).
Satter, Michael, excerpts from Internet TV with CU-SeeMe, First Edition, including inside Title Page and Copyright Page; "Overview"; "Contents," through pp. xii; Chapter 1, "Introduction to Internet Videoconferencing and CU-SeeMe," pp. 1-12; Chapter 4, "Hardware," pp. 47-64; Chapter 5, "Software," pp. 65-92; Chapter 6, "CU-SeeMe User's Guide," pp. 93-121; Chapter 9, "Other Videoconferencing Technologies," pp. 201-226; Chapter 10, What the Future Holds, pp. 227-233; Appendix A, "Troubleshooting O&A," pp. 235-249; published by Sams.net Publishing, 201 W. 103rd St., Indianapolis, IN 46290, International Standard Book No. 1-57521-006-1, Library of Congress Catalog Card No. 95-70178, copyright © 1995.
Takashi Yoshmoet al., "Namba: Location-Aware Collaboration System for Shopping and Meeting", Aug. 2002, IEEE Transactions on Consumer Electronics, pp. 470-47.
Tribal Voice, PowWow Guided Tour—Step 6, PowWow personal communication http://web.archive.org/web/2000817094516/www.tribal.com/powwow/tour/step6.cfm (Oct. 22, 1999), (2 pages).
VisiblePath webpages, www.visiblepath.org, Dec. 3, 2003, available at http://web.archive.org/web/20031203132211/http://www.visiblepath.com. printed Mar. 16, 2005, (5 pages).
Wayner, Peter, "Hey Baby, Call Me at My IP Address", Apr. 1996, pp. 142-144.
William R. Stanek, Microsoft Windows 2000 Administrator's Pocket Consultant [online]. Microsoft Corporation, 1999 [retrieved on May 8, 2003]. Retrieved from the Internet <http://www.microsoft.com/technet/prodtechnol/ad/windows2000/evaluate/05w2kadb.asp?fra . . . >, pp. 1-10.
Wingfield, N., "Technology Journal: Changing Chat—Instant Messaging Is Taking Off, and for some Users It's Nuzzling Out the Phone", Asian Wall Street Journal, New York, NY, Sep. 25, 2000, (5 pages).
Yubing Wang, Mark Claypool, Zheng Zuo. Video: An empirical study of realvideo performance across the internet. Proceedings of the 1st ACM SIGCOMM Workshop on Internet Measurement IMW'01. Nov. 2001. ACM Press. (15 pages).

ZeroDegrees home page, www.zerodegrees.com, Jan. 24, 2004, available at http://web.archive.org/web/20040204153037/www.zerodegrees.com/home.htm, printed Mar. 16, 2005, (2 pages).
U.S. Appl. No. 09/810,159, Jul. 6, 2004, Office Action.
U.S. Appl. No. 09/810,159, Feb. 11, 2005, Office Action.
U.S. Appl. No. 09/810,159, Jun. 15, 2005, Office Action.
U.S. Appl. No. 09/810,159, Dec. 2, 2005, Office Action.
U.S. Appl. No. 09/810,159, Apr. 19, 2006, Office Action.
U.S. Appl. No. 09/810,159, Jan. 11, 2008, Office Action.
U.S. Appl. No. 09/810,159, Jan. 29, 2010, Office Action.
U.S. Appl. No. 09/843,788, Mar. 30, 2004, Office Action.
U.S. Appl. No. 09/843,788, Dec. 2, 2004, Office Action.
U.S. Appl. No. 09/843,788, Jul. 27, 2005, Office Action.
U.S. Appl. No. 09/843,788, Mar. 28, 2006, Office Action.
U.S. Appl. No. 09/843,788, Jun. 12, 2006, Advisory Action.
U.S. Appl. No. 09/843,788, Apr. 19, 2007, Office Action.
U.S. Appl. No. 09/843,788, Sep. 15, 2008, Office Action.
U.S. Appl. No. 09/843,788, May 5, 2010, Office Action.
U.S. Appl. No. 09/848,231, Mar. 30, 2004, Office Action.
U.S. Appl. No. 09/848,231, May 5, 2005, Office Action.
U.S. Appl. No. 09/848,231, Jun. 3, 2011, Office Action.
U.S. Appl. No. 09/848,231, Oct. 12, 2011, Notice of Allowance.
U.S. Appl. No. 09/848,232, Aug. 19, 2004, Notice of Allowance.
U.S. Appl. No. 09/848,232, Mar. 10, 2005, Notice of Allowance.
U.S. Appl. No. 09/911,799, Oct. 5, 2004, Office Action.
U.S. Appl. No. 09/911,799, Apr. 29, 2005, Office Action.
U.S. Appl. No. 09/911,799, Nov. 17, 2005, Office Action.
U.S. Appl. No. 09/911,799, Aug. 11, 2006, Office Action.
U.S. Appl. No. 09/911,799, Jul. 3, 2007, Office Action.
U.S. Appl. No. 09/911,799, Dec. 1, 2008, Office Action.
U.S. Appl. No. 09/911,799, Mar. 18, 2009, Office Action.
U.S. Appl. No. 09/911,799, Mar. 18, 2010, Office Action.
U.S. Appl. No. 10/134,437, Nov. 1, 2005, Office Action.
U.S. Appl. No. 10/134,437, May 18, 2006, Office Action.
U.S. Appl. No. 10/134,437, Aug. 21, 2006, Office Action.
U.S. Appl. No. 10/134,437, Sep. 6, 2007, Office Action.
U.S. Appl. No. 10/134,437, Feb. 11, 2008, Office Action.
U.S. Appl. No. 10/134,437, Sep. 18, 2008, Office Action.
U.S. Appl. No. 10/134,437, Mar. 10, 2009, Office Action.
U.S. Appl. No. 10/134,437, Oct. 2, 2009, Notice of Allowance.
U.S. Appl. No. 10/134,437, Nov. 17, 2009, Notice of Allowance.
U.S. Appl. No. 10/146,814, Sep. 20, 2005, Office Action.
U.S. Appl. No. 10/146,814, May 22, 2006, Office Action.
U.S. Appl. No. 10/146,814, Dec. 11, 2006, Office Action.
U.S. Appl. No. 10/146,814, Jul. 2, 2007, Office Action.
U.S. Appl. No. 10/146,814, Apr. 15, 2008, Office Action.
U.S. Appl. No. 10/146,814, Mar. 22, 2010, Office Action.
U.S. Appl. No. 10/146,814, Oct. 1, 2010, Notice of Allowance.
U.S. Appl. No. 10/146,814, Jan. 20, 2011, Notice of Allowance.
U.S. Appl. No. 10/184,002, Aug. 25, 2005, Office Action.
U.S. Appl. No. 10/184,002, Apr. 20, 2006, Office Action.
U.S. Appl. No. 10/184,002, Jan. 9, 2007, Office Action.
U.S. Appl. No. 10/184,002, Jan. 8, 2008, Office Action.
U.S. Appl. No. 10/184,002, Jul. 24, 2008, Notice of Allowance.
U.S. Appl. No. 10/334,056, Nov. 29, 2004, Office Action.
U.S. Appl. No. 10/334,056, Jul. 6, 2005, Office Action.
U.S. Appl. No. 10/334,056, Oct. 31, 2005, Office Action.
U.S. Appl. No. 10/334,056, May 10, 2006, Office Action.
U.S. Appl. No. 10/334,056, May 21, 2007, Office Action.
U.S. Appl. No. 10/334,056, Nov. 5, 2007, Office Action.
U.S. Appl. No. 10/334,056, May 12, 2008, Office Action.
U.S. Appl. No. 10/633,636, Oct. 11, 2006, Office Action.
U.S. Appl. No. 10/633,636, Jun. 20, 2007, Office Action.
U.S. Appl. No. 10/633,636, May 25, 2010, Office Action.
U.S. Appl. No. 10/633,636, Nov. 9, 2010, Office Action.
U.S. Appl. No. 10/633,636, Oct. 27, 2011, Notice of Allowance.
U.S. Appl. No. 10/747,623, Mar. 13, 2007, Office Action.
U.S. Appl. No. 10/747,623, Aug. 21, 2007, Office Action.
U.S. Appl. No. 10/747,623, Nov. 14, 2007, Office Action.
U.S. Appl. No. 10/747,623, Jun. 23, 2008, Office Action.
U.S. Appl. No. 10/747,624, Feb. 26, 2007, Office Action.
U.S. Appl. No. 10/747,624, Jul. 16, 2007, Office Action.
U.S. Appl. No. 10/747,624, Nov. 1, 2007, Office Action.

(56) References Cited

OTHER PUBLICATIONS

U.S. Appl. No. 10/747,679, Oct. 2, 2007, Office Action.
U.S. Appl. No. 10/747,679, Apr. 29, 2008, Office Action.
U.S. Appl. No. 10/981,460, Aug. 20, 2008, Office Action.
U.S. Appl. No. 11/015,424, Mar. 19, 2008, Office Action.
U.S. Appl. No. 11/015,424, Nov. 3, 2008, Office Action.
U.S. Appl. No. 11/015,424, May 1, 2009, Office Action.
U.S. Appl. No. 11/015,424, Oct. 19, 2009, Office Action.
U.S. Appl. No. 11/017,204, Dec. 12, 2007, Office Action.
U.S. Appl. No. 11/017,204, Jun. 23, 2008, Office Action.
U.S. Appl. No. 11/150,180, Oct. 2, 2007, Office Action.
U.S. Appl. No. 11/150,180, Apr. 7, 2008, Office Action.
U.S. Appl. No. 11/150,180, Nov. 5, 2008, Office Action.
U.S. Appl. No. 11/150,180, Aug. 19, 2009, Office Action.
U.S. Appl. No. 11/150,180, Sep. 27, 2011, Notice of Allowance.
U.S. Appl. No. 11/150,180, Sep. 11, 2012, Notice of Allowance.
U.S. Appl. No. 11/150,180, Mar. 28, 2013, Notice of Allowance.
U.S. Appl. No. 11/150,180, Jun. 6, 2013, Notice of Allowance.
U.S. Appl. No. 11/237,718, Apr. 2, 2009, Office Action.
U.S. Appl. No. 11/237,718, Oct. 30, 2009, Office Action.
U.S. Appl. No. 11/238,110, Nov. 29, 2007, Office Action.
U.S. Appl. No. 11/238,110, Jul. 9, 2008, Office Action.
U.S. Appl. No. 11/238,110, Oct. 9, 2008, Office Action.
U.S. Appl. No. 11/238,129, Nov. 14, 2007, Office Action.
U.S. Appl. No. 11/238,129, May 28, 2008, Office Action.
U.S. Appl. No. 11/238,130, Jul. 3, 2008, Office Action.
U.S. Appl. No. 11/238,130, Nov. 13, 2008, Office Action.
U.S. Appl. No. 11/238,130, Apr. 14, 2009, Office Action.
U.S. Appl. No. 11/238,130, Nov. 24, 2009, Office Action.
U.S. Appl. No. 12/336,880, Aug. 4, 2010, Office Action.
U.S. Appl. No. 13/397,568, May 9, 2013, Office Action.
U.S. Appl. No. 13/616,666, Apr. 1, 2013, Office Action.
U.S. Appl. No. 13/616,678, Mar. 27, 2013, Office Action.
U.S. Appl. No. 13/616,692, Mar. 27, 2013, Office Action.
U.S. Appl. No. 13/616,707, Nov. 20, 2014, Office Action.
U.S. Appl. No. 13/616,666, Jan. 12, 2015, Notice of Allowance.
U.S. Appl. No. 13/616,678, Dec. 12, 2014, Notice of Allowance.
U.S. Appl. No. 13/149,368, Mar. 16, 2015, Office Action.
U.S. Appl. No. 13/396,132, Feb. 23, 2015, Office Action.
U.S. Appl. No. 13/616,707, Feb. 12, 2015, Office Action.
U.S. Appl. No. 13/616,734, Feb. 12, 2015, Office Action.
U.S. Appl. No. 13/617,413, Feb. 12, 2015, Office Action.
U.S. Appl. No. 13/616,666, Feb. 23, 2015, Notice of Allowance.
U.S. Appl. No. 13/616,678, Feb. 12, 2015, Notice of Allowance.
U.S. Appl. No. 13/617,413, Aug. 13, 2015, Office Action.
U.S. Appl. No. 14/586,793, Sep. 14, 2015, Office Action.
U.S. Appl. No. 13/396,132, Mar. 15, 2016, Notice of Allowance.
U.S. Appl. No. 13/616,630, Dec. 31, 2015, Office Action.
U.S. Appl. No. 13/616,630, Jul. 14, 2016, Office Action.
U.S. Appl. No. 13/616,707, Dec. 16, 2015, Office Action.
U.S. Appl. No. 13/616,707, Jun. 15, 2016, Office Action.
U.S. Appl. No. 13/616,734, Feb. 2, 2016, Office Action.
U.S. Appl. No. 13/617,413, Jan. 29, 2016, Notice of Allowance.
U.S. Appl. No. 13/617,374, Jan. 5, 2016, Office Action.
U.S. Appl. No. 13/617,374, Aug. 23, 2016, Office Action.
U.S. Appl. No. 13/620,985, Mar. 2, 2016, Notice of Allowance.
U.S. Appl. No. 13/617,402, Jan. 13, 2016, Office Action.
U.S. Appl. No. 13/617,402, Aug. 18, 2016, Notice of Allowance.
U.S. Appl. No. 14/586,793, Jun. 22, 2016, Notice of Allowance.
U.S. Appl. No. 14/690,201, Jul. 5, 2016, Office Action.
U.S. Appl. No. 13/616,630, Oct. 31, 2016, Office Action.
U.S. Appl. No. 14/702,516, Dec. 30, 2016, Office Action.
U.S. Appl. No. 14/702,516, filed May 1, 2015, Appelman.
U.S. Appl. No. 13/149,368, Jul. 30, 2015, Office Action.
U.S. Appl. No. 13/396,132, Jul. 29, 2015, Office Action.
U.S. Appl. No. 13/616,630, May 21, 2015, Office Action.
U.S. Appl. No. 13/616,707, Jul. 15, 2015, Office Action.
U.S. Appl. No. 13/616,734, Jul. 29, 2015, Office Action.
U.S. Appl. No. 13/617,374, May 21, 2015, Office Action.
U.S. Appl. No. 13/620,985, Jun. 30, 2015, Office Action.
U.S. Appl. No. 13/617,402, Jul. 28, 2015, Office Action.
U.S. Appl. No. 14/586,793, Jun. 19, 2015, Office Action.
U.S. Appl. No. 14/690,201, Jul. 30, 2015, Office Action.
U.S. Appl. No. 13/175,410, Oct. 18, 2016, Notice of Allowance.
U.S. Appl. No. 13/616,707, Oct. 6, 2016, Office Action.
U.S. Appl. No. 13/175,410, Jan. 27, 2017, Notice of Allowance.
U.S. Appl. No. 13/616,630, Mar. 21, 2017, Office Action.
U.S. Appl. No. 13/616,707, Apr. 11, 2017, Office Action.
U.S. Appl. No. 13/616,734, Mar. 24, 2017, Office Action.
U.S. Appl. No. 13/617,374, Feb. 9, 2017, Notice of Allowance.
U.S. Appl. No. 15/143,111, Mar. 15, 2017, Notice of Allowance.

\* cited by examiner

900

USER INTERFACES FOR PROVIDING SUPPLEMENTAL CONTACT INFORMATION CORRESPONDING TO A REFERENCED INDIVIDUAL

CROSS-REFERENCE TO RELATED APPLICATIONS

This application is a continuation of U.S. patent application Ser. No. 13/149,368, filed May 31, 2011, and titled "Providing Supplemental Contact Information Corresponding to a Referenced Individual", which is a continuation of U.S. patent application Ser. No. 10/146,814, filed May 17, 2002, and titled "Providing Supplemental Contact Information Corresponding to a Referenced Individual", now issued as U.S. Pat. No. 7,979,802, which is a continuation-in-part of U.S. patent application Ser. No. 09/843,788, filed Apr. 30, 2001, and titled "Automatic Configuration of an Alternate Communication Scheme," which claims the benefit of U.S. Provisional Application No. 60/201,738, filed May 4, 2000, and U.S. Provisional Application No. 60/229,311, filed Sep. 1, 2000, all of which are incorporated by reference.

TECHNICAL FIELD

The present invention relates generally to online communications systems and more particularly to an online communications system that automatically provides supplemental contact information corresponding to a referenced individual.

BACKGROUND

In the client-server network architecture of the Internet and/or the Web, electronic documents are stored in computer systems running server programs and are accessed by computer systems running client programs. For example, information on the Web is provided by Web servers and is accessible by a client program such as a Web browser (e.g., Netscape's Navigator, Microsoft's Internet Explorer, or Java's micro-browser).

Information on the Internet and/or Web may be represented by specially formatted text files (e.g., Web pages) written in Hypertext Markup Language ("HTML") or some other markup language, such as XML, HDML, and/or VRML. Each text file may be identified by a network address such as a Universal Resource Locator ("URL"). A typical Web page may include one or more hyperlinks referring to the network addresses of other Web pages. Hyperlinks may be displayed as underlined text or graphical images that, when clicked, send a request for the associated page. For example, when a hyperlink in a home page is selected, a request is sent out by the client to the address specified in the hyperlink, and the associated Web page is downloaded and displayed, by replacing the home page on the user's screen with the associated Web page.

Browsers and other client programs typically use a communications protocol such as Hypertext Transfer Protocol ("HTTP") to request pages from Web servers. HTTP is a request/response protocol. Through a connection established between a client and a server, the client sends a request to the server, and the server provides a response to the client.

An Internet service provider ("ISP") may be used to provide subscribers with access to the Internet and/or the World Wide Web ("Web"). In general, a subscriber relies on an ISP to provide computers that are connected to and therefore enable communication over the Internet and/or the Web. An ISP may offer services in addition to basic Internet access such as, for example, providing e-mail and instant messaging services that enable electronic communication, Web-hosting services that allow subscribers to publish homepages, newsgroup services that allow subscribers to read and post to newsgroups, and image services that allow subscribers to view and order digital images of pictures from a developed film roll.

SUMMARY

In one general aspect, providing supplemental contact information for an individual referenced in an electronic message typically includes receiving an electronic message, examining the electronic message, detecting an identifier for a referenced individual contained in the electronic message, and making supplemental contact information for the referenced individual available to a recipient of the electronic message. The supplemental contact information may include information that is in addition to information contained in the electronic message.

Implementations may include one or more of the following features. For example, the supplemental contact information for the referenced individual may include an e-mail address, a screen name, a telephone number, a facsimile number, and/or a mailing address, each of which is associated with the referenced individual. The supplemental contact information for the referenced individual may include supplemental contact information that was communicated by the referenced individual to a host that maintains the supplemental contact information. The electronic message may include an e-mail message and/or an instant message.

A communication scheme may be configured between a sender of the electronic message and the individual referenced in the electronic message using the supplemental contact information. The referenced individual may include a sender of the electronic message, a recipient of the electronic message, and/or a name included in a body of the electronic message.

The preferences of the referenced individual may be checked such that the supplemental contact information for the referenced individual is made available according to the preferences of the referenced individual. Additionally or alternatively, the preferences of the recipient may be checked such that additional supplemental information is made available for the referenced individual according to the preferences of the recipient.

A personal address book may be updated with the supplemental contact information of the referenced individual. A global address book that includes the supplemental contact information for the referenced individual may be maintained. The global address book may be automatically updated when the referenced individual makes changes to the supplemental contact information.

A status of online presence for the referenced individual may be made available. A real time messaging capability of the referenced individual may be determined such that the real time messaging capability of the referenced individual may be made available.

An invitation may be sent to the referenced individual to subscribe to an instant messaging service. An invitation to subscribe to an instant messaging service may be sent to a referenced individual who is not an instant messaging service subscriber.

An e-mail address may be detected for the referenced individual and a domain may be stripped from the e-mail address such that a reverse-lookup may be performed to obtain an instant messaging screen name for the referenced individual. An indicator associated with the referenced individual may be displayed to indicate available supplemental contact information.

The referenced individual may define the rights of recipients for viewing the supplemental contact information associated with the referenced individual. The referenced individual may define the rights of recipients for viewing the supplemental contact information to change temporally. The referenced individual may define the rights of recipients to enable only designated recipients to view the supplemental contact information associated with the referenced individual, only persons designated in a personal address book contact to view the supplemental information associated with the referenced individual, and/or only persons designated in a global address book to view the supplemental contact information associated with the referenced individual.

The supplemental contact information may include a screen name, which may be added to an instant messaging buddy list. Real time contact information for the referenced individual may be made available to the recipient of the electronic message.

In another general aspect, receiving supplemental contact information for an individual referenced in an electronic message typically includes receiving from a host an electronic message that includes an identifier for a referenced individual and receiving supplemental contact information for the referenced individual from the host. The supplemental contact information may be in addition to information contained in the electronic message.

Implementations may include one or more of the features described above.

These general and specific aspects may be implemented using a system, a method, or a computer program, or any combination of systems, methods, and computer programs.

Other features and advantages will be apparent from the description and drawings, and from the claims.

DETAILED DESCRIPTION

For illustrative purposes, FIGS. 1-5 show an example of a communications system for implementing techniques for transferring electronic data. For brevity, several elements in the figures described below are represented as monolithic entities. However, as would be understood by one skilled in the art, these elements each may include numerous interconnected computers and components designed to perform a set of specified operations and/or may be dedicated to a particular geographical region.

Figure 1:
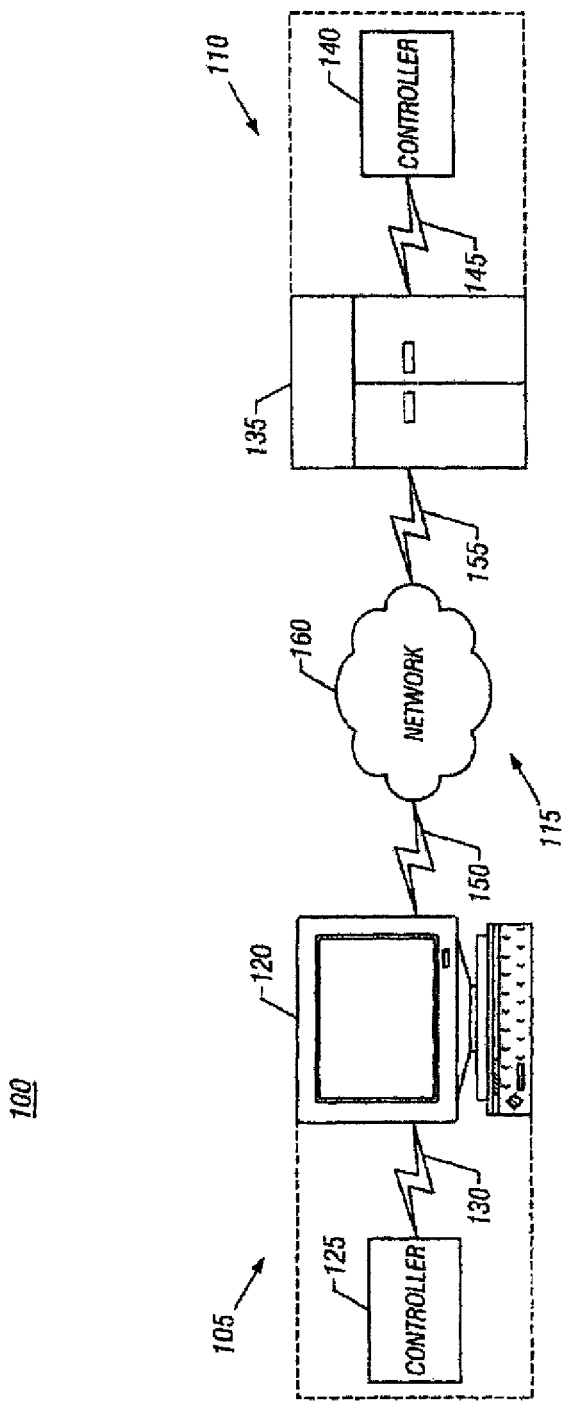
FIG. 1 is a block diagram of a communications system.

Referring to FIG. 1, a communications system 100 is capable of delivering and exchanging data between a client system 105 and a host system 110 through a communications link 115. The client system 105 typically includes one or more client devices 120 and/or client controllers 125, and the host system 110 typically includes one or more host devices 135 and/or host controllers 140. For example, the client system 105 or the host system 110 may include one or more general-purpose computers (e.g., personal computers), one or more special-purpose computers (e.g., devices specifically programmed to communicate with each other and/or the client system 105 or the host system 110), or a combination of one or more general-purpose computers and one or more special-purpose computers. The client system 105 and the host system 110 may be arranged to operate within or in concert with one or more other systems, such as, for example, one or more LANs ("Local Area Networks") and/or one or more WANs ("Wide Area Networks").

The client device 120 (or the host device 135) is generally capable of executing instructions under the command of a client controller 125 (or a host controller 140). The client device 120 (or the host device 135) is connected to the client controller 125 (or the host controller 140) by a wired or wireless data pathway 130 or 145 capable of delivering data.

The client device 120, the client controller 125, the host device 135, and the host controller 140 each typically include one or more hardware components and/or software components. An example of a client device 120 or a host device 135 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions. The client device 120 and the host device 135 may include devices that are capable of peer-to-peer communications.

An example of client controller 125 or a host controller 140 is a software application loaded on the client device 120 or the host device 135 for commanding and directing communications enabled by the client device 120 or the host device 135. Other examples include a program, a piece of code, an instruction, a device, a computer, a computer system, or a combination thereof, for independently or collectively instructing the client device 120 or the host device 135 to interact and operate as described. The client controller 125 and the host controller 140 may be embodied permanently or temporarily in any type of machine, component, physical or virtual equipment, storage medium, or propagated signal capable of providing instructions to the client device 120 or the host device 135.

The communications link 115 typically includes a delivery network 160 making a direct or indirect communication between the client system 105 and the host system 110, irrespective of physical separation. Examples of a delivery network 160 include the Internet, the World Wide Web, WANs, LANs, analog or digital wired and wireless telephone networks (e.g. PSTN, ISDN, and xDSL), radio, television, cable, satellite, and/or any other delivery mechanism for carrying data. The communications link 115 may include communication pathways 150 and 155 that enable communications through the one or more delivery networks 160 described above. Each of the communication pathways 150 and 155 may include, for example, a wired, wireless, cable or satellite communication pathway.

Figure 2:
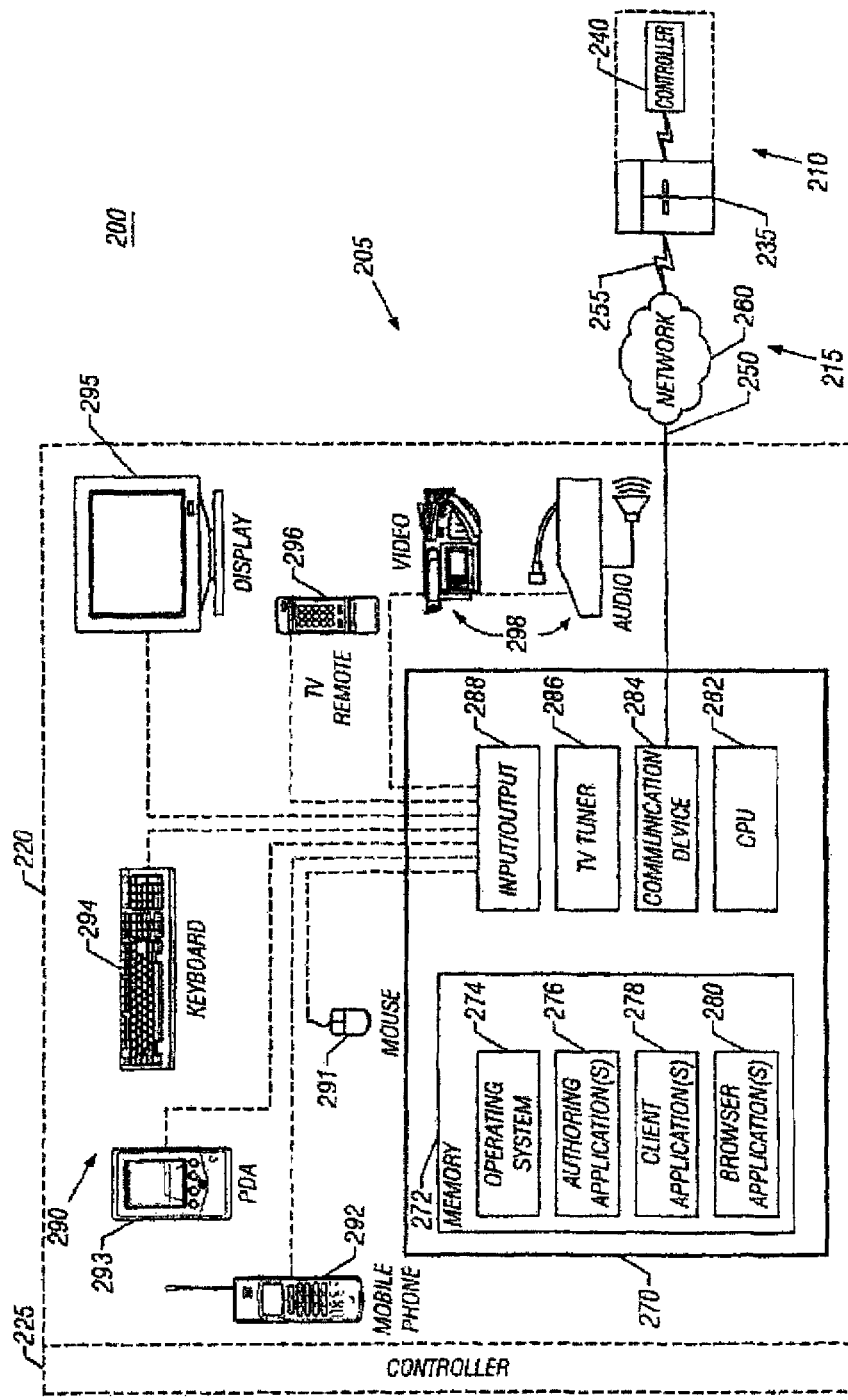
FIGS. 2, 3, 4, 5, and 6 are block diagrams of expansions of aspects of the block diagram of FIG. 1.

FIG. 2 illustrates a communications system 200 including a client system 205 communicating with a host system 210 through a communications link 215. Client system 205 typically includes one or more client devices 220 and one or more client controllers 225 for controlling the client devices 220. Host system 210 typically includes one or more host devices 235 and one or more host controllers 240 for controlling the host devices 235. The communications link 215 may include communication pathways 250 and 255 that enable communications through the one or more delivery networks 260.

Examples of each element within the communications system of FIG. 2 are broadly described above with respect to FIG. 1. In particular, the host system 210 and the communications link 215 typically have attributes comparable to those described with respect to host system 110 and communications link 115 of FIG. 1. Likewise, the client system 205 of FIG. 2 typically has attributes comparable to and illustrates one possible implementation of the client system 105 of FIG. 1.

The client device 220 typically includes a general-purpose computer 270 having an internal or external storage 272 for storing data and programs such as an operating system 274 (e.g., DOS, Windows™, Windows 95™, Windows 98™, Windows 2000™, Windows Mc™, Windows XP™, Windows NT™, OS/2, or Linux) and one or more application programs.

Examples of application programs include authoring applications 276 (e.g., word processing programs, database programs, spreadsheet programs, or graphics programs) capable of generating documents or other electronic content; client applications 278 (e.g., AOL client, CompuServe client, AIM client, AOL TV client, or ISP client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content.

The general-purpose computer 270 also includes a central processing unit 282 (CPU) for executing instructions in response to commands from the client controller 225. In one implementation, the client controller 225 includes one or more of the application programs installed on the internal or external storage 272 of the general-purpose computer 270. In another implementation, the client controller 225 includes application programs externally stored in and performed by one or more device(s) external to the general-purpose computer 270.

The general-purpose computer typically will include a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV ("television") tuner 286 for receiving television programming in the form of broadcast, satellite, and/or cable TV signals. As a result, the client device 220 can selectively and/or simultaneously display network content received by communications device 284 and television programming content received by the TV tuner 286.

The general-purpose computer 270 typically will include an input/output interface 288 for wired or wireless connection to various peripheral devices 290. Examples of peripheral devices 290 include, but are not limited to, a mouse 291, a mobile phone 292, a personal digital assistant 293 (PDA), a MP3 player (not shown), a keyboard 294, a display monitor 295 with or without a touch screen input, a TV remote control 296 for receiving information from and rendering information to subscribers, and an audiovisual input device 298.

Although devices such as a mobile telephone 292, a PDA 293, a MP3 player (not shown), and a TV remote control 296 may be peripheral with respect to the general-purpose computer 270, in another implementation, such devices may themselves include the functionality of the general-purpose computer 270 and operate as the client device 220. For example, the mobile phone 292 or the PDA 293 may include computing and networking capabilities and function as a client device 220 by accessing the delivery network 260 and communicating with the host system 210. Furthermore, the client system 205 may include one, some or all of the components and devices described above.

Figure 3:
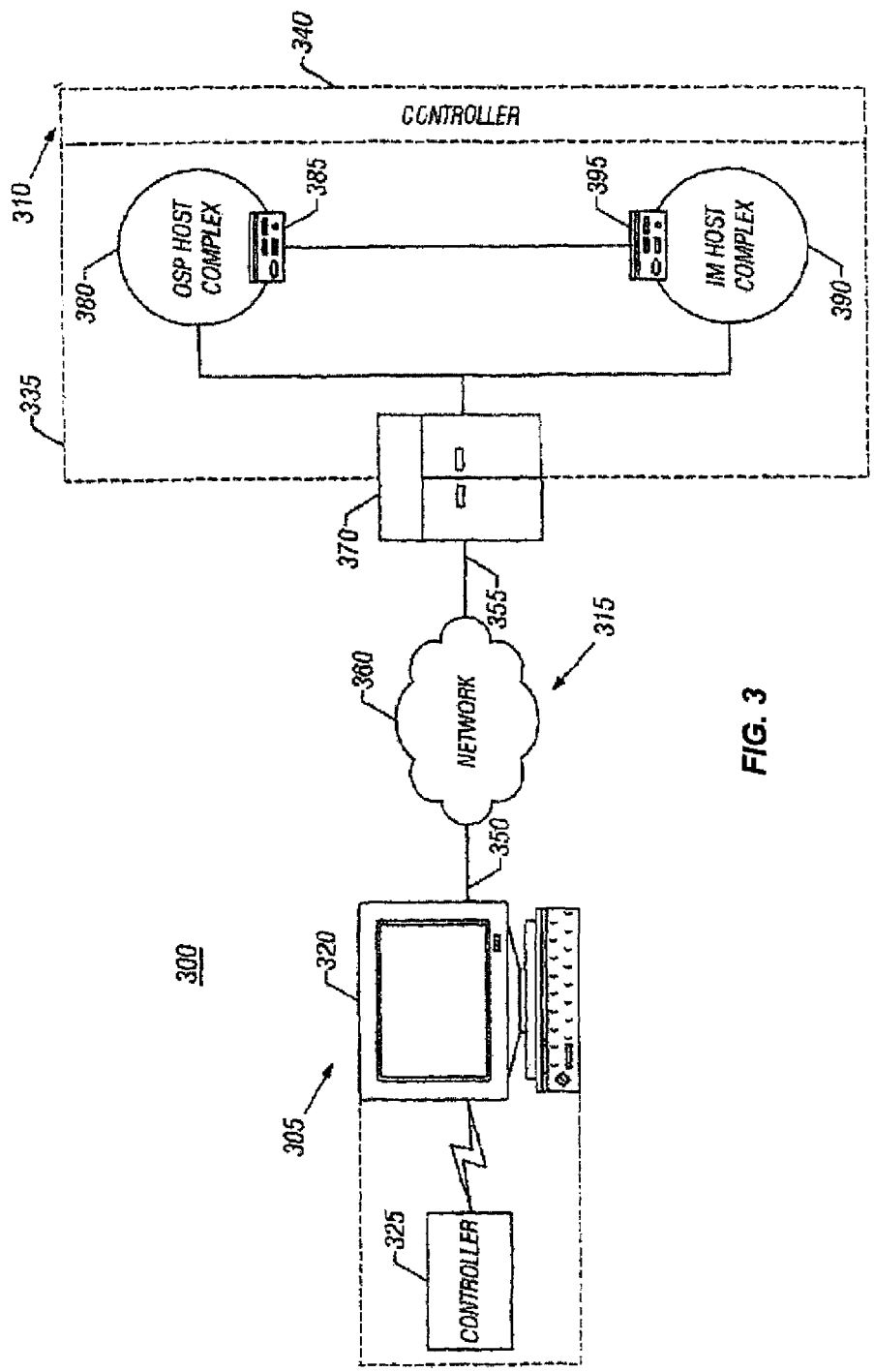

Referring to FIG. 3, a communications system 300 is capable of delivering and exchanging information between a client system 305 and a host system 310 through a communication link 315. Client system 305 typically includes one or more client devices 320 and one or more client controllers 325 for controlling the client devices 320. Host system 310 typically includes one or more host devices 335 and one or more host controllers 340 for controlling the host devices 335. The communications link 315 may include communication pathways 350 and 355 that enable communications through the one or more delivery networks 360.

Examples of each element within the communications system of FIG. 3 are broadly described above with respect to FIGS. 1 and 2. In particular, the client system 305 and the communications link 315 typically have attributes comparable to those described with respect to client systems 105 and 205 and communications links 115 and 215 of FIGS. 1 and 2. Likewise, the host system 310 of FIG. 3 may have attributes comparable to and illustrates one possible implementation of the host systems 110 and 210 shown in FIGS. 1 and 2.

The host system 310 includes a host device 335 and a host controller 340. The host controller 340 is generally capable of transmitting instructions to any or all of the elements of the host device 335. For example, in one implementation, the host controller 340 includes one or more software applications loaded on the host device 335. In other implementations, as described above, the host controller 340 may include any of several other programs, machines, and devices operating independently or collectively to control the host device 335.

The host device 335 includes a login server 370 for enabling access by subscribers and for routing communications between the client system 305 and other elements of the host device 335. The host device 335 also includes various host complexes such as the depicted OSP ("Online Service Provider") host complex 380 and IM ("Instant Messaging") host complex 390. To enable access to these host complexes by subscribers, the client system 305 includes communication software, for example, an OSP client application and an IM client application. The OSP and IM communication software applications are designed to facilitate the subscriber's interactions with the respective services and, in particular, may provide access to all the services available within the respective host complexes.

Typically, the OSP host complex 380 supports different services, such as e-mail, discussion groups, chat, news services, and Internet access. The OSP host complex 380 is generally designed with an architecture that enables the machines within the OSP host complex 380 to communicate with each other and employs certain protocols (i.e., standards, formats, conventions, rules, and structures) to transfer data. The OSP host complex 380 ordinarily employs one or more OSP protocols and custom dialing engines to enable access by selected client applications. The OSP host complex 380 may define one or more specific protocols for each service based on a common, underlying proprietary protocol.

The IM host complex 390 is generally independent of the OSP host complex 380, and supports instant messaging services irrespective of a subscriber's network or Internet access. Thus, the IM host complex 390 allows subscribers to send and receive instant messages, whether or not they have access to any particular ISP. The IM host complex 390 may support associated services, such as administrative matters, advertising, directory services, chat, and interest groups related to the instant messaging. The IM host complex 390 has an architecture that enables all of the machines within the IM host complex to communicate with each other. To transfer data, the IM host complex 390 employs one or more standard or exclusive IM protocols.

The host device 335 may include one or more gateways that connect and therefore link complexes, such as the OSP host complex gateway 385 and the IM host complex gateway 395. The OSP host complex gateway 385 and the IM host complex gateway 395 may directly or indirectly link the OSP host complex 380 with the IM host complex 390 through a wired or wireless pathway. Ordinarily, when used to facilitate a link between complexes, the OSP host complex gateway 385 and the IM host complex gateway 395 are privy to information regarding the protocol type anticipated by a destination complex, which enables any necessary protocol conversion to be performed incident to the transfer of data from one complex to another. For instance, the OSP host complex 380 and IM host complex 390 generally use different protocols such that transferring data between the complexes requires protocol conversion by or at the request of the OSP host complex gateway 385 and/or the IM host complex gateway 395.

Figure 4:
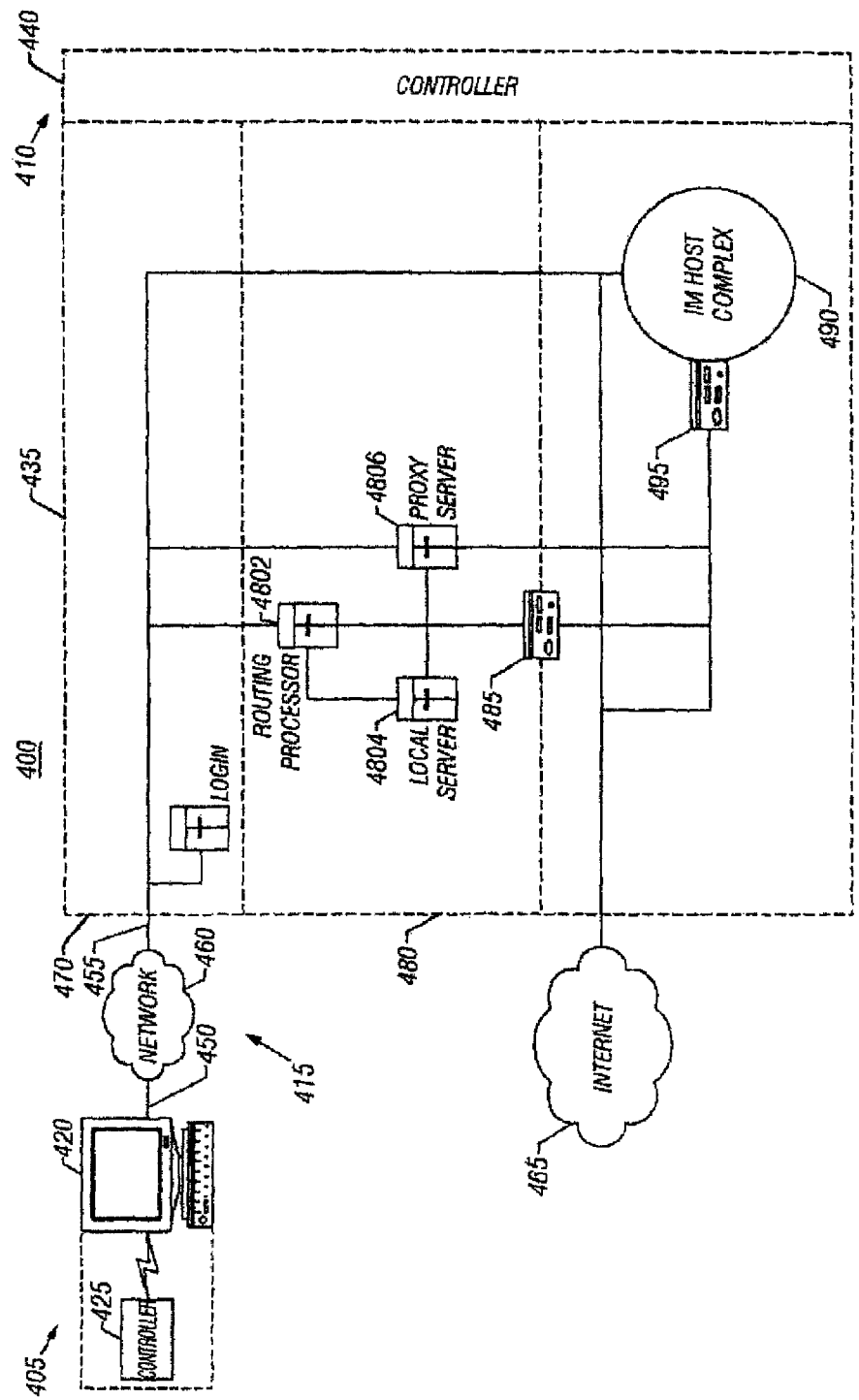

Referring to FIG. 4, a communications system 400 is capable of delivering and exchanging information between a client system 405 and a host system 410 through a communication link 415. Client system 405 typically includes one or more client devices 420 and one or more client controllers 425 for controlling the client devices 420. Host system 410 typically includes one or more host devices 435 and one or more host controllers 440 for controlling the host devices 435. The communications link 415 may include communication pathways 450 and 455 that enable communications through the one or more delivery networks 460. As shown, the client system 405 may access the Internet 465 through the host system 410.

Examples of each element within the communications system of FIG. 4 are broadly described above with respect to FIGS. 1-3. In particular, the client system 405 and the communications link 415 typically have attributes comparable to those described with respect to client systems 105, 205, and 305 and communications links 115, 215, and 315 of FIGS. 1-3. Likewise, the host system 410 of FIG. 4 may have attributes comparable to and illustrates one possible implementation of the host systems 110, 210, and 310 shown in FIGS. 1-3. FIG. 4 describes an aspect of the host system 410, focusing primarily on one particular implementation of OSP host complex 480.

The client system 405 includes a client device 420 and a client controller 425. The client controller 425 is generally capable of establishing a connection to the host system 410, including the OSP host complex 480, the IM host complex 490 and/or the Internet 465. In one implementation, the client controller 425 includes an OSP application for communicating with servers in the OSP host complex 480 using exclusive OSP protocols. The client controller 425 also may include applications, such as an IM client application, and/or an Internet browser application, for communicating with the IM host complex 490 and the Internet 465.

The host system 410 includes a host device 435 and a host controller 440. The host controller 440 is generally capable of transmitting instructions to any or all of the elements of the host device 435. For example, in one implementation, the host controller 440 includes one or more software applications loaded on one or more elements of the host device 435. In other implementations, as described above, the host controller 440 may include any of several other programs, machines, and devices operating independently or collectively to control the host device 435.

The host system 410 includes a login server 470 capable of enabling communications with and authorizing access by client systems 405 to various elements of the host system 410, including an OSP host complex 480 and an IM host complex 490. The login server 470 may implement one or more authorization procedures to enable simultaneous access to the OSP host complex 480 and the IM host complex 490. The OSP host complex 480 and the IM host complex 490 are connected through one or more OSP host complex gateways 485 and one or more IM host complex gateways 495. Each OSP host complex gateway 485 and IM host complex gateway 495 may perform any protocol conversions necessary to enable communications between the OSP host complex 480, the IM host complex 490, and the Internet 465.

The OSP host complex 480 supports a set of services from one or more servers located internal to and external from the OSP host complex 480. Servers external to the OSP host complex 480 generally may be viewed as existing on the Internet 465. Servers internal to the OSP complex 480 may be arranged in one or more configurations. For example, servers may be arranged in centralized or localized clusters in order to distribute servers and subscribers within the OSP host complex 480.

In one implementation of FIG. 4, the OSP host complex 480 includes a routing processor 4802. In general, the routing processor 4802 will examine an address field of a data request, use a mapping table to determine the appropriate destination for the data request, and direct the data request to the appropriate destination. In a packet-based implementation, the client system 405 may generate information requests, convert the requests into data packets, sequence the data packets, perform error checking and other packet-switching techniques, and transmit the data packets to the routing processor 4802. Upon receiving data packets from the client system 405, the routing processor 4802 may directly or indirectly route the data packets to a specified destination within or outside of the OSP host complex 480. For example, in the event that a data request from the client system 405 can be satisfied locally, the routing processor 4802 may direct the data request to a local server 4804. In the event that the data request cannot be satisfied locally, the routing processor 4802 may direct the data request externally to the Internet 465 or the IM host complex 490 through the gateway 485.

The OSP host complex 480 also includes a proxy server 4806 for directing data requests and/or otherwise facilitating communication between the client system 405 and the Internet 465. The proxy server 4806 may include an IP ("Internet Protocol") tunnel for converting data from OSP protocol into standard Internet protocol and transmitting the data to the Internet 465. The IP tunnel also converts data received from the Internet 465 in the standard Internet protocol back into the OSP protocol and sends the converted data to the routing processor 4802 for delivery back to the client system 405.

The proxy server 4806 also may allow the client system 405 to use standard Internet protocols and formatting to access the OSP host complex 480 and the Internet 465. For example, the subscriber may use an OSP TV client application having an embedded browser application installed on the client system 405 to generate a request in standard Internet protocol, such as HTTP ("HyperText Transport Protocol"). In a packet-based implementation, data packets may be encapsulated inside a standard Internet tunneling protocol, such as, for example, UDP ("User Datagram Protocol") and routed to the proxy server 4806. The proxy server 4806 may include an L2TP ("Layer Two Tunneling Protocol") tunnel capable of establishing a point-to-point protocol (PPP) session with the client system 405.

The proxy server 4806 also may act as a buffer between the client system 405 and the Internet 465, and may implement content filtering and time saving techniques. For example, the proxy server 4806 can check parental controls settings of the client system 405 and request and transmit content from the Internet 465 according to the parental control settings. In addition, the proxy server 4806 may include one or more caches for storing frequently accessed information. If requested data is determined to be stored in the caches, the proxy server 4806 may send the information to the client system 405 from the caches and avoid the need to access the Internet 465.

Figure 5:
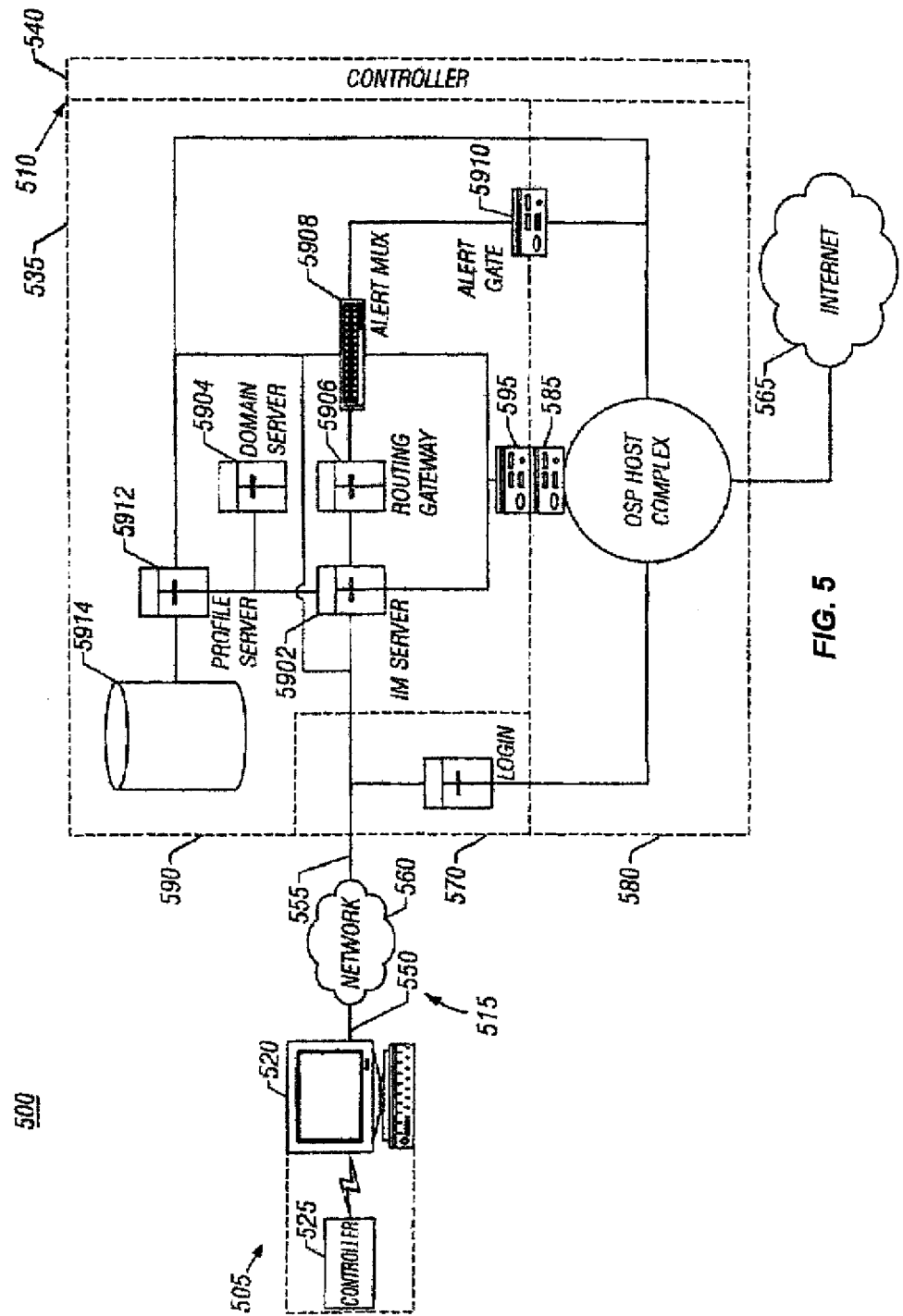

Referring to FIG. 5, a communications system 500 is capable of delivering and exchanging information between a client system 505 and a host system 510 through a communication link 515, Client system 505 typically includes one or more client devices 520 and one or more client controllers 525 for controlling the client devices 520. Host system 510 typically includes one or more host devices 535 and one or more host controllers 540 for controlling the host devices 535. The communications link 515 may include communication pathways 550 and 555 that enable communications through the one or more delivery networks 560. As shown, the client system 505 may access the Internet 565 through the host system 510.

Examples of each element within the communications system of FIG. 5 are broadly described above with respect to FIGS. 1-4. In particular, the client system 505 and the communications link 515 typically have attributes comparable to those described with respect to client systems 105, 205, 305, and 405 and communications links 115, 215, 315, and 415 of FIGS. 1-4. Likewise, the host system 510 of FIG. 5 may have attributes comparable to and illustrates one possible implementation of the host systems 110, 210, 310, and 410 shown in FIGS. 1-4. FIG. 5 describes an aspect of the host system 510, focusing primarily on one particular implementation of IM host complex 590.

The client system 505 includes a client device 520 and a client controller 525. The client controller 525 is generally capable of establishing a connection to the host system 510, including the OSP host complex 580, the IM host complex 590 and/or the Internet 565. In one implementation, the client controller 525 includes an IM application for communicating with servers in the IM host complex 590 utilizing exclusive IM protocols. The client controller 525 also may include applications, such as an OSP client application, and/or an Internet browser application for communicating with the OSP host complex 580 and the Internet 565, respectively.

The host system 510 includes a host device 535 and a host controller 540. The host controller 540 is generally capable of transmitting instructions to any or all of the elements of the host device 535. For example, in one implementation, the host controller 540 includes one or more software applications loaded on one or more elements of the host device 535. However, in other implementations, as described above, the host controller 540 may include any of several other programs, machines, and devices operating independently or collectively to control the host device 535.

The host system 510 includes a login server 570 capable of enabling communications with and authorizing access by client systems 505 to various elements of the host system 510, including an OSP host complex 580 and an IM host complex 590. The login server 570 may implement one or more authorization procedures to enable simultaneous access to the OSP host complex 580 and the IM host complex 590. The OSP host complex 580 and the IM host complex 590 are connected through one or more OSP host complex gateways 585 and one or more IM host complex gateways 595. Each OSP host complex gateway 585 and IM host complex gateway 595 may perform any protocol conversions necessary to enable communication between the OSP host complex 580, the IM host complex 590, and the Internet 565.

To access the IM host complex 590 to begin an instant messaging session, the client system 505 establishes a connection to the login server 570. The login server 570 typically determines whether the particular subscriber is authorized to access the IM host complex 590 by verifying a subscriber identification and password. If the subscriber is authorized to access the IM host complex 590, the login server 570 employs a hashing technique on the subscriber's screen name to identify a particular IM server 5902 for use during the subscriber's session. The login server 570 provides the client system 505 with the IP address of the particular IM server 5902, gives the client system 505 an encrypted key (i.e., a cookie), and breaks the connection. The client system 505 then uses the IP address to establish a connection to the particular IM server 5902 through the communications link 515, and obtains access to that IM server 5902 using the encrypted key. Typically, the client system 505 will be equipped with a Winsock API ("Application Programming Interface") that enables the client system 505 to establish an open TCP connection to the IM server 5902.

Once a connection to the IM server 5902 has been established, the client system 505 may directly or indirectly transmit data to and access content from the IM server 5902 and one or more associated domain servers 5904. The IM server 5902 supports the fundamental instant messaging services and the domain servers 5904 may support associated services, such as, for example, administrative matters, directory services, chat and interest groups. In general, the purpose of the domain servers 5904 is to lighten the load placed on the IM server 5902 by assuming responsibility for some of the services within the IM host complex 590. By accessing the IM server 5902 and/or the domain server 5904, a subscriber can use the IM client application to view whether particular subscribers ("buddies") are online, exchange instant messages with particular subscribers, participate in group chat rooms, trade files such as pictures, invitations or documents, find other subscribers with similar interests, get customized news and stock quotes, and search the World Wide Web.

In the implementation of FIG. 5, the IM server 5902 is directly or indirectly connected to a routing gateway 5906.

The routing gateway 5906 facilitates the connection between the IM server 5902 and one or more alert multiplexors 5908, for example, by serving as a link minimization tool or hub to connect several IM servers 5902 to several alert multiplexors 5908. In general, an alert multiplexor 5908 maintains a record of alerts and subscribers registered to receive the alerts.

Once the client system 505 is connected to the alert multiplexor 5908, a subscriber can register for and/or receive one or more types of alerts. The connection pathway between the client system 505 and the alert multiplexor 5908 is determined by employing another hashing technique at the IM server 5902 to identify the particular alert multiplexor 5908 to be used for the subscriber's session. Once the particular multiplexor 5908 has been identified, the IM server 5902 provides the client system 505 with the IP address of the particular alert multiplexor 5908 and gives the client system 505 an encrypted key (i.e., a cookie). The client system 505 then uses the IP address to connect to the particular alert multiplexor 5908 through the communication link 515 and obtains access to the alert multiplexor 5908 using the encrypted key.

The alert multiplexor 5908 is connected to an alert gate 5910 that, like the IM host complex gateway 595, is capable of performing the necessary protocol conversions to form a bridge to the OSP host complex 580. The alert gate 5910 is the interface between the IM host complex 590 and the physical servers, such as servers in the OSP host complex 580, where state changes are occurring. In general, the information regarding state changes will be gathered and used by the IM host complex 590. However, the alert multiplexor 5908 also may communicate with the OSP host complex 580 through the IM host complex gateway 595, for example, to provide the servers and subscribers of the OSP host complex 580 with certain information gathered from the alert gate 5910.

The alert gate 5910 can detect an alert feed corresponding to a particular type of alert. The alert gate 5910 may include a piece of code (alert receive code) capable of interacting with another piece of code (alert broadcast code) on the physical server where a state change occurs. In general, the alert receive code installed on the alert gate 5910 instructs the alert broadcast code installed on the physical server to send an alert feed to the alert gate 5910 upon the occurrence of a particular state change. Upon detecting an alert feed, the alert gate 5910 contacts the alert multiplexor 5908, which in turn, informs the client system 505 of the detected alert feed.

In the implementation of FIG. 5, the IM host complex 590 also includes a subscriber profile server 5912 connected to a database 5914 for storing large amounts of subscriber profile data. The subscriber profile server 5912 may be used to enter, retrieve, edit, manipulate, or otherwise process subscriber profile data. In one implementation, a subscriber's profile data includes, for example, the subscriber's buddy list, alert preferences, designated stocks, identified interests, and geographic location. The subscriber may enter, edit and/or delete profile data using an installed IM client application on the client system 505 to interact with the subscriber profile server 5912.

Because the subscriber's data is stored in the IM host complex 590, the subscriber does not have to reenter or update such information in the event that the subscriber accesses the IM host complex 590 using a new or a different client system 505. Accordingly, when a subscriber accesses the IM host complex 590, the IM server 5902 can instruct the subscriber profile server 5912 to retrieve the subscriber's profile data from the database 5914 and to provide, for example, the subscriber's buddy list to the IM server 5902 and the subscriber's alert preferences to the alert multiplexor 5908. The subscriber profile server 5912 also may communicate with other servers in the OSP host complex 580 to share subscriber profile data with other services. Alternatively, user profile data may be saved locally on the client device 505.

Figure 6:
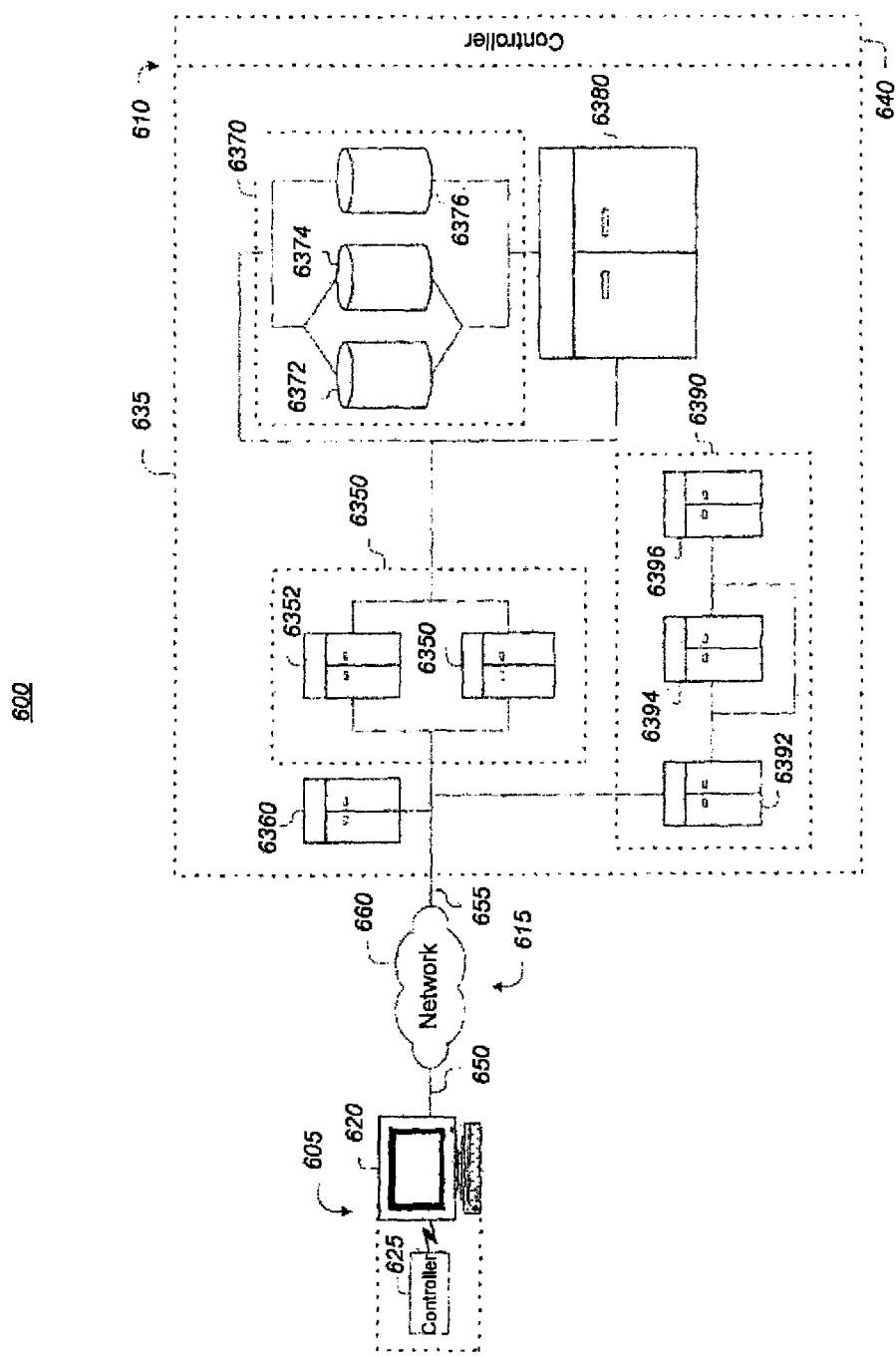

Referring to FIG. 6, a communications system 600 is capable of delivering and exchanging information between a client system 605 and a host system 610 through a communication link 615. Client system 605 typically includes one or more client devices 620 and one or more client controllers 625 for controlling the client devices 620. Host system 610 typically includes one or more host devices 635 and one or more host controllers 640 for controlling the host devices 635. The communication link 615 may include communication pathways 650 and 655 that enable communications through the one or more delivery networks 660. The network 660 may be any known or described delivery network including, but not limited, to a telephone network and/or the Internet, Examples of each element within the communication system of FIG. 6 are broadly described above with respect to FIGS. 1-5. In particular, the client system 605 and the communications link 615 typically have attributes comparable to those described with respect to client systems 105, 205, 305, 405, and 505 and communications links 115, 215, 315, 415, and 515 of FIGS. 1-5. Likewise, the host system 610 of FIG. 6 may have attributes comparable to and illustrates one possible implementation of the host systems 110, 210, 310, 410, and 510 shown in FIGS. 1-5, respectively. However, FIG. 6 describes an aspect of the host system 610, focusing primarily on one particular implementation of the host device 635.

The client system 605 includes a client device 620 and a client controller 625. The client controller 625 is generally capable of establishing a connection to the host system 610 through the delivery network 615. In one implementation, the client controller 625 includes one or more applications, such as an IM application, an OSP application, and/or an Internet browser application.

The host system 610 includes a host device 635 and a host controller 640. The host controller 640 is generally capable of transmitting instructions to any or all of the elements of the host device 635. For example, in one implementation, the host controller 640 includes one or more software applications loaded on one or more elements of the host device 635. However, in other implementations, as described above, the host controller 640 may include any of several other programs, machines, and devices operating independently or collectively to control the host device 635. The host device 635 includes a mail gateway 6350 having a send mail server 6352 and a read mail server 6354. The send mail server 6352 is configured to perform functions relating to transmitting electronic data. The read mail server 6354 is configured to perform functions relating to receiving and accessing electronic data. The mail gateway 6350 is in communication with one or more processing servers 6360.

The mail gateway 6350 also is in communication with the storage area 6370 and a tandem database 6380. The storage area 6370 includes electronic content databases 6372, 6374 and attachment database 6376. The tandem database 6380 includes a system of folders that store electronic data for subscribers of the host system 610.

The host device 635 also includes an identification ("ID") host complex 6390. The ID host complex 6390 includes a configuration server 6392 in communication with the client system 605, the read mail server 6352, a look-up server 6394, and an IM server 6396. The IM server 6396 typically has attributes comparable to some or all elements of IM host complexes 390, 490, 590, and 690. In general, the IM server 6396 is capable of supporting instant messaging services including the identification of whether a particular individual is available for IM messaging, the look-up server 6394 is capable of finding subscriber account information (e.g., screen name) from a given e-mail address, and the configuration server 6392 is capable of configuring communication schemes between the intended recipient of an e-mail message and the sender and/or other recipients of the e-mail message. The configuration server 6392 may include an electronic data store (e.g., a cache) that may be used, for example, to cache attributes of electronic data communicated using the host 610. The cache of attributes of electronic data may be associated with a previously encountered message (e.g., a cache entry may indicate that a message stored in the cache with ID=514 references individuals x, y, z) to avoid the need to analyze the message each time it is encountered.

Figure 7:
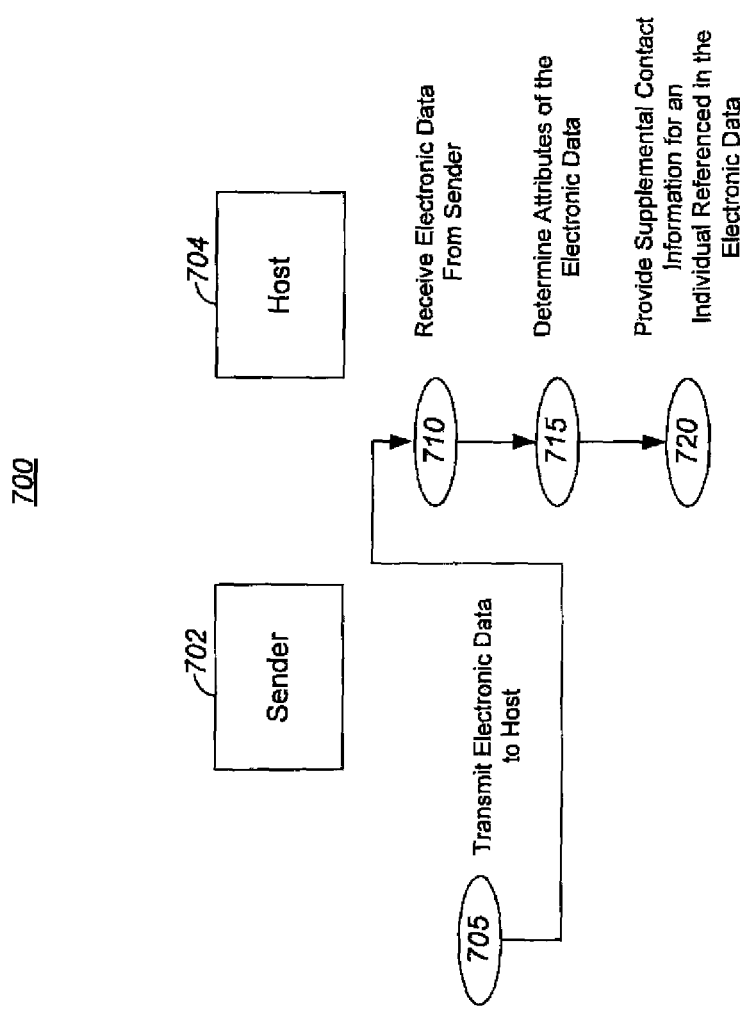
FIGS. 7 and 8 are flows charts of communications methods that may be implemented by the system of FIG. 1.
Figure 8:
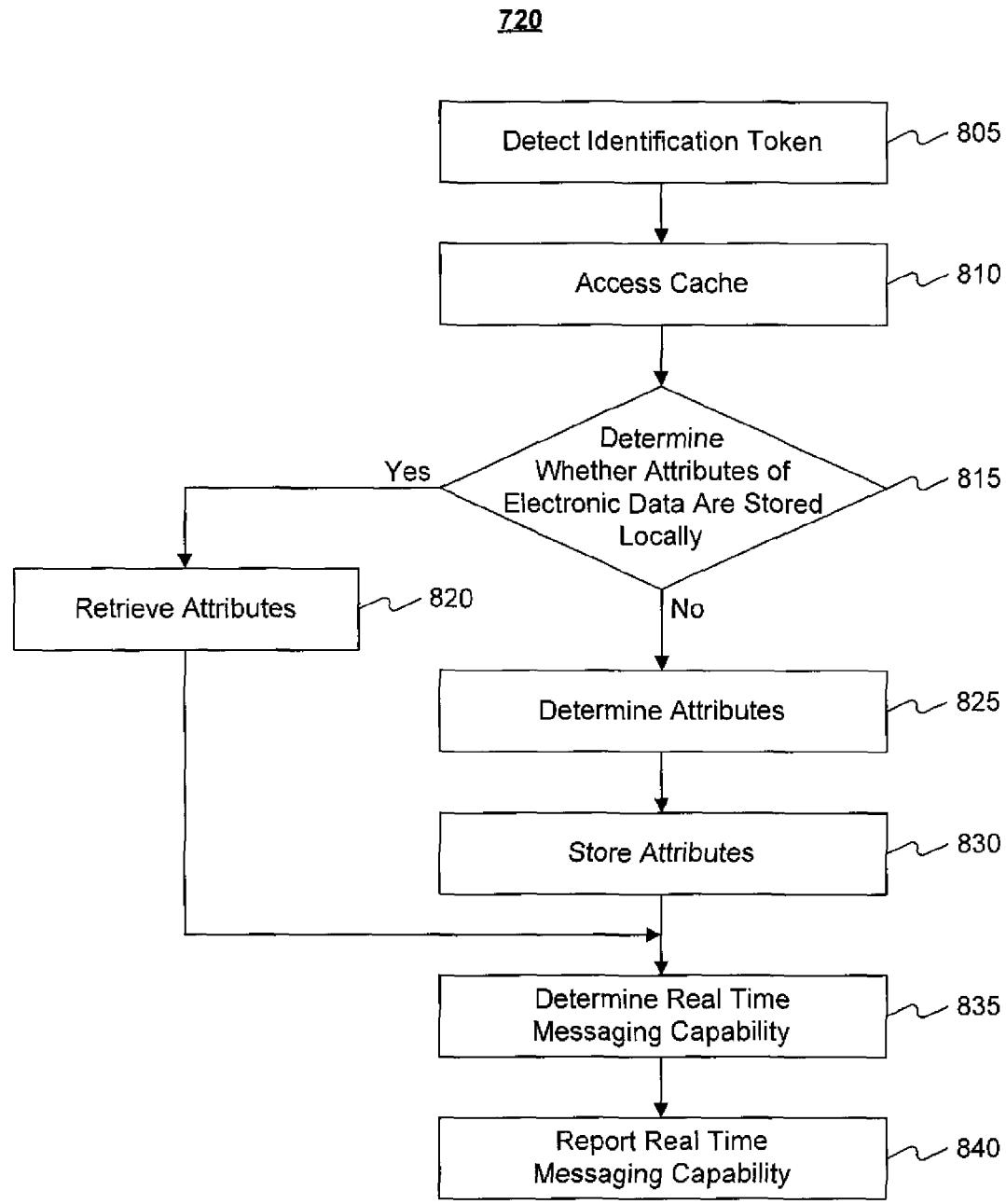

Referring to FIGS. 7 and 8, a sender 702 and a host 704 interact according to a procedure 700 to transmit electronic data. The procedure 700 may be implemented by any type of hardware, software, device, computer, computer system, equipment, component, program, application, code, storage medium, or propagated signal.

Examples of each element of FIGS. 7 and 8 are broadly described above with respect to FIGS. 1-6. In particular, the sender 702 typically has attributes comparable to those described with respect to client devices 120, 220, 320, 420, 520, and 620 and/or client controllers 125, 225, 325, 425, 525, and 625. The host 704 typically has attributes comparable to those described above with respect to host devices 135, 235, 335, 435, 535, and 635 and/or host controllers 140, 240, 340, 440, 540, and 640. The sender 702 and/or the host 704 may be directly or indirectly interconnected through a known or described delivery network.

Initially, the sender 702 transmits electronic data to the host 704 (step 705). In one implementation, the sender 702 is a client system 605 associated with an end user of the communication system 600. In another implementation, the sender 702 aids the client system 605 in transmitting electronic data through a communications link 615 to the host system 610. In yet another implementation, the sender 702 is a processing server 6360 within the host system 610. For example, the processing server 6360 may be a web mail server arranged to store and forward electronic data transmitted between end users of the communication system 600.

The host 704 receives the electronic data from the sender 702 (step 710). In one implementation, the host 704 includes a mail gateway such as mail gateway 6350 of FIG. 6. In this implementation, the mail gateway 6350 generally receives the electronic data from the client system 605 and/or the processing server 6360. Typically, the mail gateway 6350 will receive electronic content from subscribers through a dial-up telephone network or DSL (digital subscriber line) and will receive electronic content from non-subscribers indirectly through the Internet. The mail gateway 6350 may perform protocol conversions if necessary to receive electronic content from non-subscribers.

After receiving the electronic data from the sender 702 (step 710), the host 704 determines one or more attributes of the electronic data (step 715). Attributes of the electronic data may include, but are not limited to, an identification token, the author of the electronic data, the recipient(s) of the electronic data, the subject of the electronic data, the date and time of the transmission, and/or whether the electronic data contains attachments or embedded images. The host 704 typically will store the contents and attributes of the electronic data. For example, in one implementation of the structure shown by FIG. 6, contents of the electronic data are stored in the storage area 6370 and the attributes of the electronic data are cached locally in the configuration server 6392 and also stored in the tandem database 6380. The body of the electronic data is stored in electronic content databases 6372, 6374 and any attachments are stored in the attachment database 6376. In this example, the body of the electronic data is stored twice to assure its availability. Due to the typically large sizes of attachments, however, such objects are only stored once to conserve memory space. The tandem database 6380 includes a system of actual or virtual folders corresponding to the subscribers of the host system 610. Each folder may have properties assigned by the subscriber including, for example, properties for filtering electronic content from certain sources. When electronic data are received, the folder stores the attributes of the electronic data including the location(s) of the electronic data content (i.e., body and attachments) in the storage area 6370.

The host 704 then provides supplemental contact information for a referenced individual (step 720). The supplemental contact information for the referenced individual may be provided to the sender of the electronic data, the recipients of the electronic data, and other individuals referenced in the electronic data. In one implementation, the host 704 uses the supplemental contact information to configure a communication scheme between the recipient and the referenced individual.

In one implementation, the supplemental contact information may include real time contact information. Real time contact information includes information that reflects the current availability of the user to communicate through one or more communication schemes. For example, the real time contact information may include a referenced individual's current online status to communicate using instant messaging or a referenced individual's current availability to communicate using phone communications.

Additionally or alternatively, real time contact information may include information that reflects contact information provided by the referenced individual for display to others seeking their availability when viewing electronic messages that identify the individual.

FIG. 8 illustrates one implementation of a process 720 for providing supplemental contact information for a referenced individual. Initially, the configuration server 6392 detects a token or other information capable of identifying incoming electronic data (e.g., an e-mail message or an instant message) (step 805). The identification token may be intercepted by the configuration server 6392 and/or presented to the configuration server 6392 by the client system 605, the processing server 6360, and/or the read mail server 6354 (communication path not shown by FIG. 6). Referencing the token, the configuration server 6392 accesses a cache (step 810) and determines whether attributes of the electronic data are stored locally (step 815). Such attributes may include, but are not limited to, a listing of referenced individuals associated with the electronic data. The listing of referenced individuals may include the sender and all recipients associated with the electronic data identified from addressing information. The listing of referenced individuals also may include names detected in the body of an electronic communication. For example, the listing of referenced individuals associated with an e-mail message may include the sender of the e-mail message, all recipients of the e-mail message, and any names of individuals detected in the body of the e-mail message.

If attributes of the electronic data are stored locally, the configuration server 6392 retrieves the attributes from the local cache (step 820). If, on the other hand, attributes of the electronic data are not stored locally, the configuration server 6392 determines the attributes of the electronic data (step 825) and then supplements the local cache with those attributes (step 830). The configuration server 6392 may determine the attributes of the electronic data itself and/or may access another server to determine the attributes. In one implementation, the configuration server 6392 accesses the read mail server 6354. The read mail server 6354 then determines attributes of the electronic data. Determining attributes of the electronic data may include detecting referenced individuals associated with the electronic data by examining addressing information and the content of the electronic data. The read mail server 6354 then presents the attributes to the configuration server 6392. The configuration server 6392 receives the listing from the read mail server 6354 and stores the listing in the local cache.

The configuration server 6392 sends the listing of referenced individuals to the look-up server 6394, which can be used to determine the real time messaging capability of each referenced individual (step 835). In one implementation, the look-up server 6394 determines whether supplemental contact information is associated with any or all referenced individuals.

The supplemental contact information may include e-mail addresses, IM screen names, telephone numbers, and/or mailing addresses associated with the referenced individual. However, the referenced individuals may or may not be subscribers of the communication system 600. For instance, in one implementation, the listing includes e-mail addresses of subscribers and non-subscribers. Thus, to facilitate a determination of real time messaging capabilities, the configuration server 6392 may strip the domain (e.g., @aol.com) from the e-mail address of a subscriber with a recognized domain to obtain the subscriber's screen name and facilitate a reverse look-up process. In another implementation, the listing includes names detected in the content of an electronic message (e.g., an e-mail message or an instant message) or e-mail addresses otherwise recognizable to the configuration server 6392.

In general, the supplemental contact information will be provided by the referenced individuals themselves and will be maintained by the host system 610. For example, a subscriber may provide contact information when establishing an account with the host system 610. A subscriber also may provide contact information transparently by connecting to host system 610 and allowing the host system 610 to monitor the subscriber's online presence.

In one implementation, the host system 610 maintains a global electronic address book containing supplemental contact information associated with subscribers. Each subscriber may control what type of contact information is provided and to whom such contact information is made available. In addition, each subscriber may place conditions on when certain contact information is made available. For instance, a subscriber may make certain contact information available only at specified times.

In one example, a subscriber may make supplemental contact information available only to family members. In this example, the subscriber may have minimal privacy concerns and therefore may allow family members access to supplemental contact information including home and work e-mail addresses, IM screen names, telephone numbers, facsimile numbers, and mailing addresses. In addition, the subscriber may provide contact information for a person to contact in emergency cases when the subscriber is unavailable.

In another example, the subscriber may make supplemental contact information available to fellow employees during working hours. In this example, the subscriber may allow fellow employees access to supplemental contact information including a work e-mail address, IM screen name, telephone number, facsimile number, and mailing address. In addition, the subscriber may provide contact information for an assistant or supervisor that people should contact in urgent cases when the subscriber is unavailable. In another example for a working environment, the supplemental contact information may include an office layout (i.e., a map) so that a remote manager may be able to reach an unresponsive employee by sending a message to an employee located in close proximity to the unresponsive employee.

In yet another example, the subscriber may set preferences to enable the supplemental contact information to be provided to designated persons. For example, the subscriber may designate which group or groups of persons may receive the supplemental contact information, such as, senders of electronic messages, other recipient of electronic messages, and/or other individuals referenced. The subscriber may designate specific individuals to received the supplemental contact information. Additionally and/or alternatively, the subscriber may designate specific individuals who should be blocked from receiving the supplemental contact information.

A subscriber may set preferences that control the presentation of supplemental contact information by the host system 610. For example, the subscriber may allow the host system 610 to examine some or all of the content of electronic messages sent to or by the subscriber. In one implementation, the host system 610 may examine the content of an electronic message (e.g., an e-mail message or an instant message) authored by the subscriber or delivered to the subscriber, detect names of referenced individuals included in the electronic message, and provide supplemental contact information for each referenced individual, if available.

In addition, the host system 610 may update a personal address book associated with the subscriber. For example, the host system 610 may ask the subscriber if a referenced individual should be included in a subscriber's personal address book and/or may ask the subscriber if an existing entry for a referenced individual in the subscriber's personal address book should be updated with the supplemental contact information. Upon receiving an affirmative response from the subscriber, the host system 610 may populate and/or update the subscriber's personal address book. The subscriber's personal address book may be maintained on the host system 610 and/or on the subscriber's client system 605.

In some cases, a subscriber may allow the host system 610 to facilitate the acquisition of supplemental contact information. Typically, a subscriber will set preferences that control the amount of intervention by the host system 610. In one implementation, a subscriber may allow the host system 610 to automatically update a global electronic address book containing supplemental contact information associated with the subscriber. That is, the host system 610 may be permitted to automatically update a subscriber's contact information in the global electronic address book as new contact information for the subscriber becomes available. For example, contact information may be automatically added or updated whenever a subscriber creates and/or changes an e-mail address, screen name, telephone number, facsimile number, and/or mailing address. As such, the most current contact information associated with the subscriber may be made available to other subscribers.

In one implementation, the configuration server 6392 interacts with the IM server 6396 to make known whether referenced individuals are available for instant messaging communication, and to enable such communications. For example, the configuration server 6392 may request the IM server 6396 to identify the IM state (e.g., online, offline, away, busy, not a member) of each referenced individual. As described above, the IM server 6396 may be a network of interconnected servers capable of determining the status or online presence of subscribers. The online presence of the referenced individual can be detected, for example, from a persistent connection to an IM server and/or the activity of a specific control port.

In response to the request, the IM server 6396 identifies the IM state of the referenced individual to the configuration server 6392. In one implementation, the IM state is given by whether the referenced individual is online, offline, or does not have instant messaging capability. The configuration server 6392 may instruct the IM server 6396 to send an invitation to referenced individuals without instant messaging capability. The invitation may invite the referenced individual to subscribe to the IM host complex 6390 and/or the host system 610. For referenced individuals having instant messaging capability, the IM server 6396 reports whether each referenced individual is online or offline.

Once the look-up server 6394 has determined the supplemental contact information for the referenced individuals, the look-up server 6394 reports the real time messaging capabilities of each referenced individual to the configuration server 6392 (step 840). In one implementation, the look-up server 6394 identifies the capability of each referenced individual to communicate by e-mail, instant messaging, telephone, facsimile, and regular mail, for example, by using icons near references to the individual's name/reference within the electronic content, or by changing the font of the individual's name/reference. The look-up server 6394 also may provide supplemental contact information (e.g., screen name, e-mail address, telephone number, facsimile number, mailing address) to the configuration server 6392. Based on the reported capabilities of the references individuals, the configuration server 6392 facilitates real time communication with each referenced individual.

Figure 9:
FIGS. 9, 10, 11A, and 11B are illustrations of different graphical user interfaces that may be provided by the system of FIG. 1.

In one implementation, when the look-up server 6394 reports the real time messaging capabilities of each referenced individual to the configuration server 6392, the configuration server 6392 may present a particular instant messaging user interface ("UI"). For example, the configuration server 6392 may cause a user's existing buddy list window to be updated with the screen names of referenced individuals capable of participating in an IM session. Additionally or alternatively, a new buddy list window may be created and updated with referenced individuals capable of participating in an IM session. In the example of FIG. 9, the UI 900 includes a buddy list window. The screen names of referenced individuals who are able to receive instant messages will appear in the buddy list window in a new group called Mail Contacts. A user may send an instant message to a person in the Mail Contacts list by clicking that person's screen name. Thus, when an individual referenced in electronic content (e.g., in an e-mail) is determined to have IM capabilities, a buddy list window may be presented with a screen name of the referenced individual.

Figure 10:
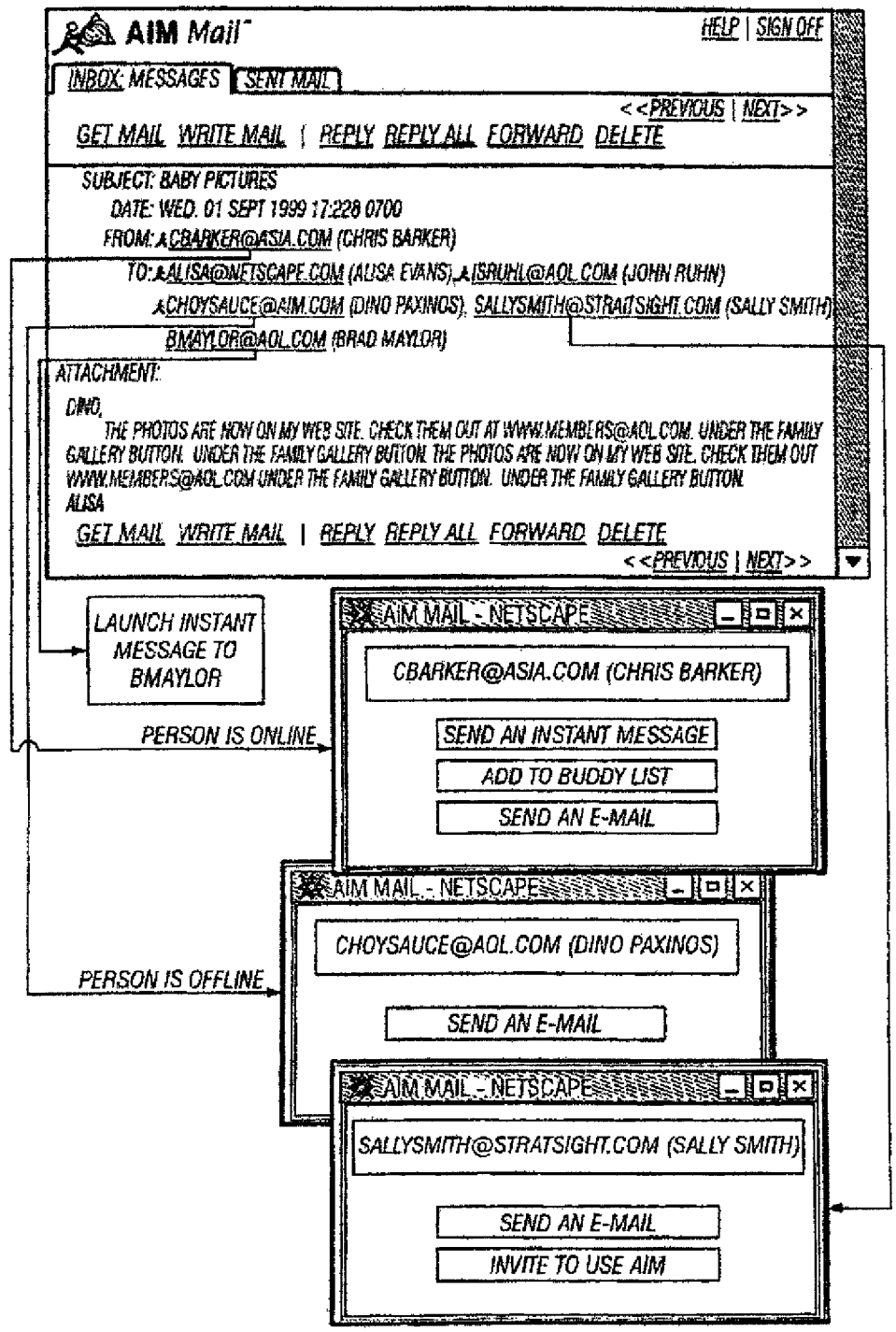

FIG. 10 illustrates another example of how the IM state of each of the sender and the recipients may be represented. An icon may indicate that the referenced individual has IM capability. The icon may be presented upon opening an e-mail message, for example, in response to one or more redirection commands associated with the IM state of the referenced individual. The redirection command may include a URL for navigating a browser to a particular URL associated with a graphical user interface and/or icon corresponding to one of the IM states. By clicking on the IM icon, a subscriber may launch an instant message.

Where an icon does not appear next to a referenced individual, the referenced individual does not presently have IM capability, and selection of the subscriber reference (e.g., screen name) may elicit a list of other contact information. Thus, even if a referenced individual does not have IM capability, a subscriber still may be able to communicate with the referenced individual through an alternate communication scheme. For example, the configuration server 6392 may receive an e-mail address for a referenced individual with e-mail capability. In one implementation, the configuration server 6392 displays an e-mail address of a referenced individual. By clicking the e-mail address, the subscriber may launch an e-mail message to the referenced individual, or the user may be presented with other forms of contact information such as the telephone number of the individual.

It should be noted that the e-mail address is displayed according to the supplemental contact information. As such, the displayed e-mail address is not necessarily the e-mail address included in the originally-transmitted message. For example, if a referenced individual has indicated a preferred e-mail address, the preferred e-mail address will displace another e-mail address. To illustrate with reference to FIG. 10, assume that a referenced individual (Sally Smith) has indicated that a work e-mail address (sallysmith@straitsight.com) is to be provided as supplemental contact information during working hours and that a home e-mail address (sallysmith@aol.com) is to be provided as supplemental contact information during all other times. Even if a sender (Chris Barker) sends the e-mail message using the home e-mail address (sallysmith@aol.com), the work e-mail address (sallysmith@straitsight.com) may be displayed when the e-mail message is opened during working hours.

Figure 11A:
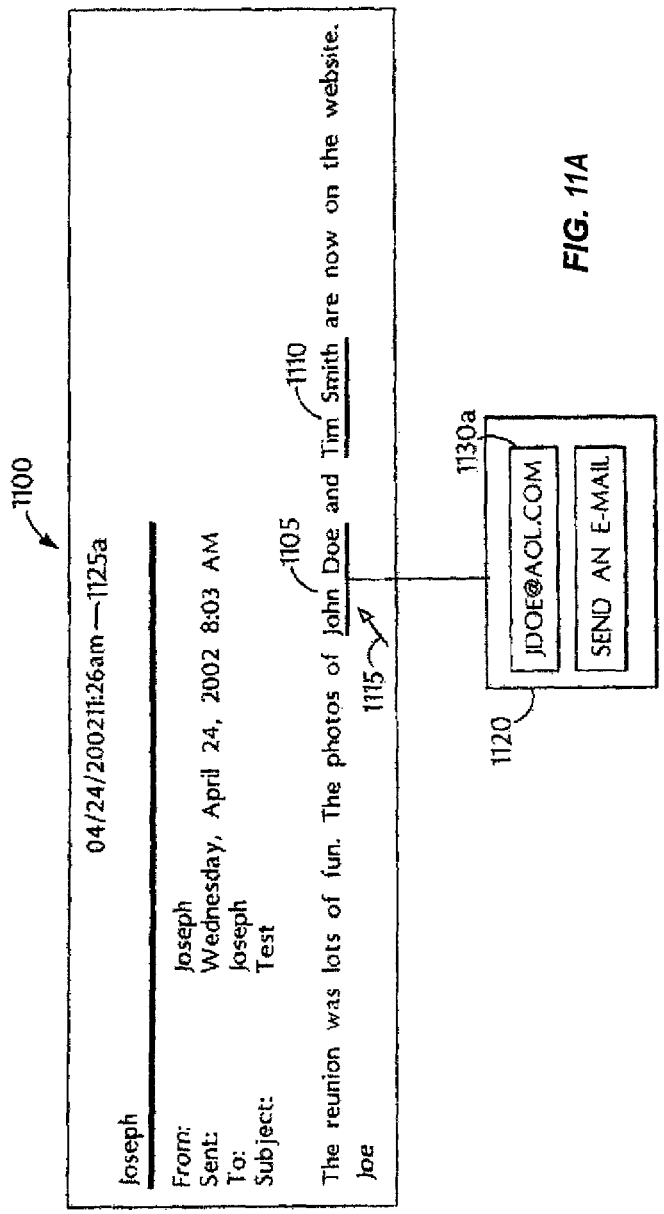
Figure 11B:
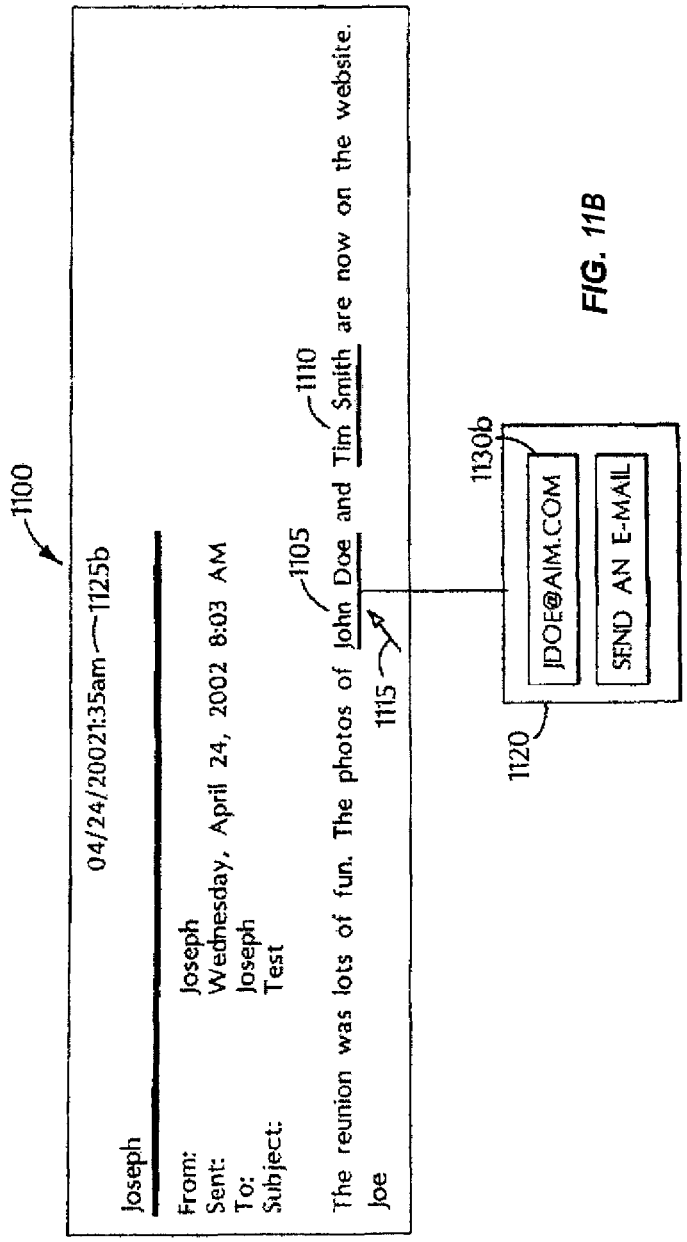

FIGS. 11A and 11B illustrate another example of how the supplemental contact information for referenced individuals may be presented. For example, in FIG. 11A, e-mail 1100 includes two referenced individuals in the body of the e-mail 1100 (i.e., John Doe 1105 and Tim Smith 1110). As the cursor 1115 is moved over the referenced individuals 1105 and 1110, a window (e.g., a pop-up window) may be displayed for each referenced individual listing the individual's supplemental contact information. For instance, as cursor 1115 is moved over John Doe 1105, pop-up window 1120 displays John Doe's supplemental contact information.

The supplemental contact information displayed in the pop-up window 1120 may depend on the date and/or time at which the e-mail is being viewed. In this case, the date-time stamp 1125a on e-mail 1100 indicates that the e-mail 1100 is being viewed on "04/24/2002 11:26 AM" 1125a. Based on the date and the time 1125a that the e-mail 1100 is being viewed, the supplemental contact information for John Doe indicates that the address "JDOE@AOL.COM" 1130a should be used to reach John Doe by e-mail.

In FIG. 11B, when the same e-mail 1100 is viewed at a different time 1125b, the pop-up window 1120 displays different supplemental contact information for John Doe 1105. In this case, based on the date and time 1125b that the e-mail 1100 is being viewed, the supplemental contact information for John Doe indicates that the address "JDOE@AIM.COM" 1130b should be used to reach John Doe by e-mail.

As is true with respect to other drawings, the contact information may be provided for individuals referenced in the header (e.g., To, From, cc) or body of the message, and may be formed of complete or partial names or aliases, or by complete or partial reference to other contact information that is recognizable and that may be associated with the individual. Furthermore, the pop-up window of FIGS. 11A and 11B, while shown as being positioned so as to avoid overlap of the current message, may be positioned over, under, or away from the viewable area of the message that references the individual.

In one exemplary implementation, an individual referenced in an electronic message may make other supplemental information available to recipients of the electronic message based on the preferences of the recipient. A host system may facilitate this exchange of supplemental information by maintaining this other supplemental information for the referenced individual and by enabling recipients to designate the other supplemental information they desire to receive about referenced individuals. For example, the host may maintain other supplemental information provided by the referenced individual, such as, for example, a type of PDA used, date of birth, clothes sizes, favorites (e.g., type of food or restaurant), and other types of other supplemental information. A recipient, who also may subscribe to the host system, may designate what other supplemental information the recipient desires to receive about referenced individuals, if that information is made available by a referenced individual. For example, in addition to supplemental contact information, a recipient also may want to receive information about a referenced individual's favorite restaurant. As long as that information is made available by a referenced individual, then the recipient may receive that information.

While the general aspects described above relate to instant messaging and e-mail, other types of supplemental contact information such as telephone numbers, facsimile numbers, and mailing addresses for the referenced individual may be displayed. In some implementations, all available supplemental contact information for a referenced individual is displayed. For example, a pull-down menu listing all supplemental contact information for a referenced individual may be presented by clicking text or an icon associated with the referenced individual. In such cases, a subscriber may choose the manner in which to contact the referenced individual. In other implementations, only the most efficient or reliable ways of contacting the referenced individual are displayed. For example, limited contact information such as a primary e-mail address, screen name, and telephone number may be displayed even if other contact information is available.

Other implementations are within the scope of the following claims.

What is claimed is:

1. A computing device comprising:
a display; and
a graphical user interface produced on the display, the graphical user interface comprising:
a first interface portion displayed on the display, the first interface portion comprising:
an electronic message associated with a messaging medium;
a first selectable identifier for a first user within the electronic message, wherein the first user subscribes to an online communication system;
a selectable graphical element specific to the first user indicating that the first user subscribes to the online communication system; and
a second selectable identifier for a second user within the electronic message, wherein the second user does not subscribe to the online communication system;
wherein upon selection of the selectable graphical element, a second interface portion specific to the first user is displayed on the display, the second interface portion including a messaging interface for communicating with the first user using the online communication system;
wherein upon selection of the first selectable identifier, a third interface portion specific to the first user is displayed on the display, the third interface portion comprising a customized menu of one or more options associated with the first user; and
wherein upon selection of the second selectable identifier, a fourth interface portion specific to the second user is displayed on the display, the fourth interface portion comprising an option to invite the second user to subscribe to the online communication system.

2. The computing device as recited in claim 1, wherein the third interface portion comprises a plurality of options for communicating via a plurality of different electronic messaging media with the first user.

3. The computing device as recited in claim 1, wherein the selectable graphical element further indicates a real time presence of the first user on a second electronic messaging medium.

4. The computing device as recited in claim 3, wherein the second electronic messaging medium comprises an instant message system.

5. The computing device as recited in claim 3, wherein the selectable graphical element comprises a logo corresponding to the second electronic messaging medium.

6. The computing device as recited in claim 1, wherein the third interface portion further comprises additional information for the first user, the additional information comprising one or more of an email address, a screen name, a telephone number, or a mailing address.

7. The computing device as recited in claim 1, wherein the second interface portion comprises an instant message interface.

8. The computing device as recited in claim 1, wherein the first selectable identifier comprises a name.

9. The computing device as recited in claim 1, wherein the third interface portion comprises a pop-up window.

10. The computing device as recited in claim 9, wherein the third interface portion is displayed in a position that avoids overlap with a body of the electronic message.

11. The computing device as recited in claim 9, wherein the third interface portion is displayed in a position that overlaps with a body of the electronic message.

12. The computing device as recited in claim 1, further comprising an option displayed in the third interface portion, the option being operable to add a co-user associated with the first selectable identifier to a list of co-users.

13. The computing device as recited in claim 1, wherein the third interface portion further comprises a first option to send an instant message to the first user and a second option to send an email to the first user.

14. A non-transitory computer-readable storage medium comprising a set of instructions that, when executed, cause a computing system to:
   display a first interface portion on a client device, the first interface portion comprising:
      an electronic message associated with an electronic messaging medium;
      a first selectable identifier for a first user within the electronic message, wherein the first user subscribes to an online communication system;
      a selectable graphical element specific to the first user indicating that the first user subscribes to the online communication system; and
      a second selectable identifier for a second user within the electronic message, wherein the second user does not subscribe to the online communication system;
   display, in response to a selection of the selectable graphical element, a second interface portion specific to the first user, the second interface portion including a messaging interface for communicating with the first user using the online communication system; and
   display, in response to a selection of the first selectable identifier, a third interface portion specific to the first user comprising a customized menu of one or more options associated with the first user; and
   display, in response to a selection of the second selectable identifier, a fourth interface portion specific to the second user comprising an option to invite the second user to subscribe to the online communication system.

15. The non-transitory computer-readable storage medium as recited in claim 14, further comprising instructions that, when executed, cause the computing system to:
   communicate with one or more remote servers to determine a status of the first user; and
   customize the third interface portion based on the determined status of the first user.

16. The non-transitory computer-readable storage medium as recited in claim 15, further comprising instructions that, when executed, cause the computing system to display, within the third interface portion, an option to send a message to the first user.

17. The non-transitory computer-readable storage medium as recited in claim 16, wherein the third interface portion comprises a pop-up window.

18. The non-transitory computer-readable storage medium as recited in claim 17, further comprising instructions that, when executed, cause the computing system to display the third interface portion in a position that avoids overlap with a body of the electronic message.

19. The non-transitory computer-readable storage medium as recited in claim 18, further comprising instructions that, when executed, cause the computing system to display a first option displayed in the third interface portion, the first option being operable to add the first user to a list of users.

20. The non-transitory computer-readable storage medium as recited in claim 14, further comprising instructions that, when executed, cause the computing system to:
   display a first option in the third interface portion for sending an instant message to the first user; and
   display a second option in the third interface portion for sending an email to the first user.

21. A method comprising:
   displaying a graphical user interface, the graphical user interface comprising:
      a first interface portion comprising:
         an electronic message associated with an electronic messaging medium;
         a first selectable identifier for a first user within the electronic message, wherein the first user subscribes to an online communication system;
         a selectable graphical element specific to the first user indicating that the first user subscribes to the online communication system; and
         a second selectable identifier for a second user within the electronic message, wherein the second user does not subscribe to the online communication system;
   displaying, in response to a selection of the selectable graphical element, a second interface portion specific to the first user, the second interface portion including a messaging interface for communicating with the first user using the online communication system;
   displaying, in response to a selection of the first selectable identifier, a third interface portion specific to the first user comprising a customized menu of one or more options associated with the first user; and
   displaying, in response to a selection of the second selectable identifier, a fourth interface portion specific to the second user comprising an option to invite the second user to subscribe to the online communication system.

22. The method as recited in claim 21, the one or more options comprising a first selectable option displayed in the third interface portion for sending an instant message to the first user.

23. The method as recited in claim 22, the one or more options further comprising a second selectable option displayed in the third interface portion for sending an email to the first user.

24. The method as recited in claim 23, wherein the first selectable identifier comprises a name.

25. The method as recited in claim 24, wherein the third interface portion comprises a pop-up window.

26. The method as recited in claim 25, wherein the third interface portion is displayed in a position that avoids overlap with a body of the electronic message.

27. The method as recited in claim 25, wherein the third interface portion is displayed in a position that overlaps with a body of the electronic message.

28. The method as recited in claim 23, the one or more options further comprising a third selectable option for adding the first user to a user list.

29. The method as recited in claim 22, further comprising:
   communicating with one or more remote servers to determine a status of the first user; and
   customizing the third interface portion based on the determined status of the first user.

* * * * *